(12) United States Patent
Zhang et al.

(10) Patent No.: US 9,509,575 B2
(45) Date of Patent: Nov. 29, 2016

(54) METHOD, APPARATUS AND SYSTEM FOR MARKING SERVICE DATA PACKET

(71) Applicant: Huawei Technologies Co., Ltd., Shenzhen (CN)

(72) Inventors: Aiqin Zhang, Shenzhen (CN); Weisheng Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 14/502,524

(22) Filed: Sep. 30, 2014

(65) Prior Publication Data
US 2015/0016299 A1    Jan. 15, 2015

Related U.S. Application Data

(63) Continuation of application No. PCT/CN2013/072565, filed on Mar. 14, 2013.

(30) Foreign Application Priority Data

Apr. 6, 2012   (CN) .......................... 2012 1 0099832

(51) Int. Cl.
*H04L 12/24* (2006.01)
*H04L 12/733* (2013.01)
(Continued)

(52) U.S. Cl.
CPC ......... *H04L 43/028* (2013.01); *H04L 12/1407* (2013.01); *H04L 47/2408* (2013.01); *H04L 67/14* (2013.01)

(58) Field of Classification Search
CPC ...... H04L 41/12; H04L 45/20; H04W 24/02; H04W 40/24; H04W 40/32; H04W 84/18
USPC ........................................ 370/254
See application file for complete search history.

(56) References Cited

U.S. PATENT DOCUMENTS

| 2011/0243077 A1* | 10/2011 | Tazaki | H04L 47/10 370/329 |
| 2013/0170350 A1* | 7/2013 | Sarkar | H04W 28/24 370/235 |
| 2014/0089420 A1* | 3/2014 | Morris | G06Q 10/107 709/206 |

FOREIGN PATENT DOCUMENTS

| CN | 102131172 A | 7/2011 |
| CN | 102137368 A | 7/2011 |
| WO | WO 2008/136604 A1 | 11/2008 |

OTHER PUBLICATIONS

Office Action dated Jun. 19, 2015 for corresponding Chinese Patent Application No. 201210099832.4, 33 pages.
(Continued)

*Primary Examiner* — Ronald B Abelson
(74) *Attorney, Agent, or Firm* — Brinks Gilson & Lione

(57) ABSTRACT

A method, an apparatus and a system for marking a service data packet are provided. A traffic detection function TDF is requested to detect a data flow description or data flow starting or ending information corresponding to a service application type. The detected data flow description or a data flow starting or ending information report, transmitted by the TDF, is received. A data packet marking rule is generated according to the data flow description or the data flow starting or ending information report. A session modification message carrying the data packet marking rule is transmitted to a bearer binding function entity BBF for the BBF to map a data flow identified by the session modification message to a bearer according to the session modification message, and mark a GTP-U header according to the data packet marking rule.

20 Claims, 9 Drawing Sheets

(51) Int. Cl.

| | |
|---|---|
| *H04W 24/02* | (2009.01) |
| *H04W 40/24* | (2009.01) |
| *H04W 40/32* | (2009.01) |
| *H04W 84/18* | (2009.01) |
| *H04L 12/26* | (2006.01) |
| *H04L 29/08* | (2006.01) |
| *H04L 12/14* | (2006.01) |
| *H04L 12/851* | (2013.01) |

(56) References Cited

OTHER PUBLICATIONS

Office Action dated Feb. 24, 2016 for corresponding Chinese Patent Application No. 201210099832.4, 26 pages.
Huawei, "DISC on Service Identification for RRC Improvements in GERAN" Agenda Item 6.19, 3GPP TSG CT WG4 #56, Xiamen, China, Feb. 6-10, 2012, C4-120171, 4 pages.
Huawei, "Clarification of ADC rules ACK in the PCRF-init IP-CAN session Modification Procedure" Change Request, 23.203 CR 0514, rev 1, version 11.0.1, 3GPP TSG-SA2 Meeting #83, Salt Lake City, Utah, Feb. 21-25, 2011, 6 pages.
Nokia Siemens Networks, "PCC Considerations for SIRIG" Agenda Item 6.19(CT4)/11.32(CT3), 3GPP TSG WG4 Meeting #56, 3GPP TSG CT WG3 Meeting #67, Xiamen, People's Republic of China, Feb. 6-10, 2012, 4 pages.
Alcatel-Lucent, "DISC on Service Identification for RRC Improvements in Geran" Agenda Item 6.19 (CT4)/11.32(CT3), 3GPP TSG CT WG4 Meeting #56, 3GPP TSG-CT WG3 Meeting #68, Xiamen, China, Feb. 6-10, 2012, 8 pages.
Balbas et al., "Policy and Charging Control in the Evolved Packet System" LTE-3GPP Release 8, IEEE Communications Magazine, Feb. 2009, 8 pages.
Lte, "3$^{rd}$ Generation Partnership Project; Technical Specification Group Services and System Aspects; Policy and charging control architecture" (Release 11) 3GPP TS 23.203, V11.5.0, Mar. 2012, 175 pages.

* cited by examiner

METHOD, APPARATUS AND SYSTEM FOR MARKING SERVICE DATA PACKET

CROSS-REFERENCE TO RELATED APPLICATIONS

This application is a continuation of International Application No. PCT/CN2013/072565, filed on Mar. 14, 2013, which claims priority to Chinese Patent Application No. 201210099832.4, filed on Apr. 6, 2012, both of which are hereby incorporated by reference in their entireties.

TECHNICAL FIELD

The present invention relates to the field of communications, and more particularly to a method, an apparatus and a system for marking a service data packet.

BACKGROUND

With the development of technologies, different Internet application-based services appear in the mobile network, such as, peer-to-peer (P2P) applications of numerous download services and streaming media services (such as BitTorrent of P2P services), QQ services and HTTP browsing services, and these services have different operator's earnings, user's application requirements and even delay-sensitive features of the service itself. In a long term evolution (LTE) system, a universal mobile telecommunications system (UMTS) or a GSM/EDGE radio access network (GERAN) system, these services may be on the same one end-to-end bearer, and thereby a base station fails to distinguish data packets of different applications during processing; in the prior art, the method that the base station can identify target service data by adding a data packet detection function on the PCEF has been provided, however, when functions between network elements are completed separately, the base station fails to identify target service data, thereby degrading the user experience.

SUMMARY

Embodiments of the present invention provide a method, an apparatus and a system for marking a service data packet, so as to improve the user experience.

To achieve the above object, embodiments of the present invention provide technical solutions as follows:

In one aspect, the present invention provides a method for marking a service data packet, where the method is applied in a case of providing data flow and application information by an external traffic detection function entity or an application server, and the method includes:

requesting a traffic detection function entity TDF to detect a data flow description corresponding to a service application type or data flow starting or ending information corresponding to the service application type;

receiving, transmitted by the TDF, the detected data flow description corresponding to the service application type or a data flow starting or ending information report corresponding to the service application type, and generating a data packet marking rule according to the data flow description corresponding to the service application type or the data flow starting or ending information report corresponding to the service application type; and transmitting, to a bearer binding function entity BBF, a session modification message carrying the data packet marking rule, so that the BBF maps a data flow identified by the session modification message to a bearer according to the session modification message, and marks a GPRS tunneling protocol-user plane GTP-U header according to the data packet marking rule.

In one aspect, the present invention provides a method for marking a service data packet, where the method is applied in a case of providing data flow and application information by an external traffic detection function entity or an application server, and the method includes:

receiving, transmitted by a policy and charging rule function PCRF, a request of detecting a data flow description corresponding to a service application type or data flow starting or ending information corresponding to the service application type;

performing data packet detection to detect the data flow description corresponding to the service application type or a data flow starting or ending report corresponding to the service application type;

transmitting the detected data flow description corresponding to the service application type or the data flow starting or ending report corresponding to the service application type to the PCRF, so that the PCRF generates a data packet marking rule, and transmits a session modification message carrying the data packet marking rule to a bearer binding function BBF entity, and then the BBF maps a data flow identified by the session modification message to a bearer according to the session modification message, and marks a GPRS tunneling protocol-user plane GTP-U header according to the data packet marking rule.

In one aspect, the present invention provides a method for marking a service data packet, where the method is applied in a case of providing data flow and application information by an external traffic detection function entity or an application server, and the method includes:

receiving, transmitted by a policy and charging rule function entity PCRF, a session modification message carrying a data packet marking rule, where the data packet marking rule is generated by the PCRF according to a data flow description corresponding to a service application type or a data flow starting or ending report corresponding to the service application type, detected by a TDF;

mapping a data flow identified by the session modification message to a bearer, and marking a GTP-U header according to the data packet marking rule.

In one aspect, the present invention provides an apparatus for marking a service data packet, including:

a requesting unit, configured to request a traffic detection function entity TDF to detect a data flow description corresponding to a service application type or data flow starting or ending information corresponding to the service application type;

a receiving unit, configured to receive the data flow description corresponding to the service application type or a data flow starting or ending information report corresponding to the service application type, requested by the requesting unit and detected by the TDF;

a rule generating unit, configured to generate a data packet marking rule according to the data flow description corresponding to the service application type or the data flow starting or ending information report corresponding to the service application type, received by the receiving unit; and a transmitting unit, configured to transmit, to a bearer binding function entity BBF, a session modification message carrying the data packet marking rule generated by the generating unit, so that the BBF maps a data flow identified by the session modification message to a bearer according to the session modification message, and marks a GPRS tunneling protocol-user plane GTP-U header according to the data packet marking rule.

In one aspect, the present invention provides an apparatus for marking a service data packet, including:

a receiving unit, configured to receive, transmitted by a policy and charging rule function PCRF, a request of detecting a data flow description corresponding to a service application type or data flow starting or ending information corresponding to the service application type;

a detecting unit, configured to perform data packet detection to detect the data flow description corresponding to the service application type or a data flow starting or ending report corresponding to the service application type, after the receiving unit receives the request;

a transmitting unit, configured to transmit the data flow description corresponding to the service application type or the data flow starting or ending report corresponding to the service application type, detected by the detecting unit, to the PCRF, so that the PCRF generates a data packet marking rule, and transmits a session modification message carrying the data packet marking rule to a bearer binding function BBF entity, and then the BBF maps a data flow identified by the session modification message to a bearer according to the session modification message, and marks a GPRS tunneling protocol-user plane GTP-U header according to the data packet marking rule.

In one aspect, the present invention provides an apparatus for marking a service data packet, including:

a receiving unit, configured to receive, transmitted by a policy and charging rule function entity PCRF, a session modification message carrying a data packet marking rule, wherein the data packet marking rule is generated by the PCRF according to a data flow description corresponding to a service application type or a data flow starting or ending report corresponding to the service application type, detected by a TDF;

a marking unit, configured to map a data flow identified by the session modification message to a bearer according to the session modification message received by the receiving unit, and mark a GTP-U header according to the data packet marking rule.

In one aspect, the present invention provides a system for marking a service data packet, including:

the apparatuses for marking a service data packet according to above apparatus.

Embodiments of the present invention provide a method, an apparatus and a system for marking a service data packet, a session establishment request message carrying the data packet marking rule is transmitted to the bearer binding function entity, so that the bearer binding function entity can map the data flow identified by the data packet marking rule to the appropriate bearer according to the data packet marking rule, and mark the GTP-U header with the data flow description; in view of a case that the base station needs to add a data packet detection function on the PCEF for identifying target service data in the prior art, technical solutions of the present invention allow the base station to identify target service data and achieve a differentiated scheduling when the data packet arrives at the base station in a case that the PCEF does not possess the data packet detection function, so that the user experience can be improved.

BRIEF DESCRIPTION OF DRAWINGS

To illustrate the technical solutions in embodiments of the present invention more clearly, accompanying drawings needed in the embodiments or the prior art are illustrated briefly in the following. Apparently, the accompanying drawings show certain embodiments of the present invention, and persons skilled in the art can derive other drawings from them without creative efforts.

DESCRIPTION OF EMBODIMENTS

The technical solutions in embodiments of the present invention are hereinafter described clearly and comprehensively with reference to the accompanying drawings in embodiments of the present invention. Obviously, the embodiments described here are a part of the embodiments of the present invention but not all of the embodiments. All other embodiments, which can be derived by persons skilled in the art from the embodiments given herein without creative efforts, shall fall within the protection scope of the present invention.

It should be noted that, a data packet detection function is added on the PCEF in the prior art, the PCEF itself marks the GTP-U header with an application type or an application class value based on the result of the data packet detection, but data transfer between network element entities is not necessary because the whole processing has been completed inside of the PCEF node, however, when the function of a TDF (traffic detection function) is implemented by an independent entity, a new solution for how to coordinate network elements is needed. Or, when an application function entity has application data flow information, but the data flow needs to be marked on the PCEF, as for how to transfer information between network elements and how to coordinate network elements to guide the PCEF to mark the data packet, a further standardized solution is also needed; in view of the above problems, the present invention provides the following technical solutions, which can guide the PCEF to mark the data packet through coordination between network elements.

Figure 1:
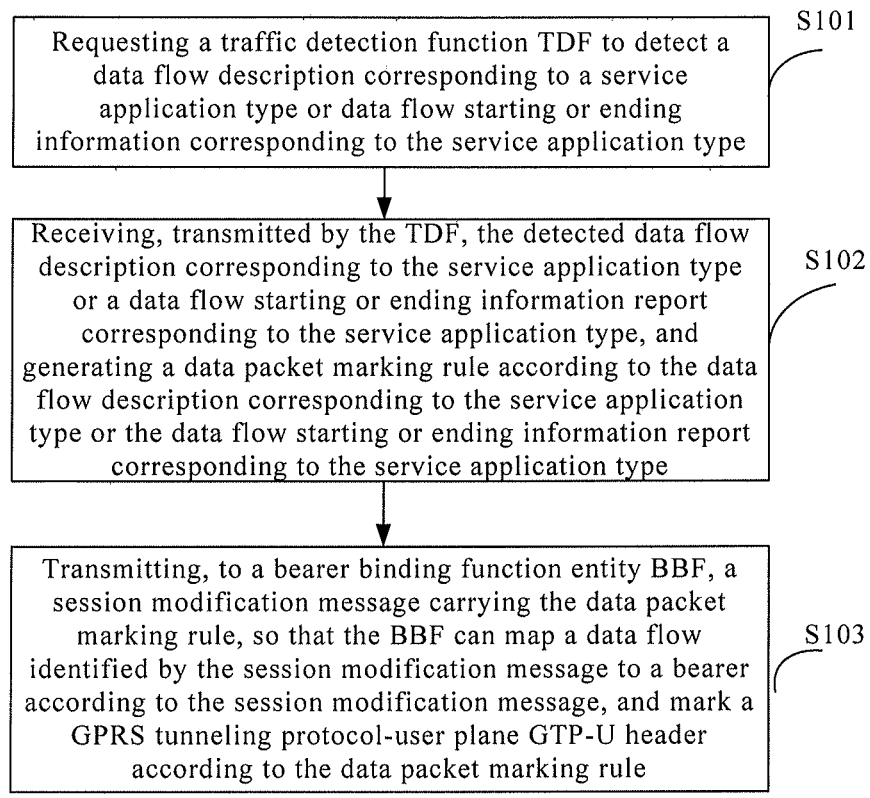
FIG. 1 is a flowchart of a method for marking a service data packet according to an embodiment of the present invention.

A method for marking a service data packet according to an embodiment of the present invention is applied in a case of providing data flow and application information by an external TDF or an application server, as shown in FIG. 1, the method includes:

S101, Requesting a traffic detection function entity TDF to detect a data flow description corresponding to a service application type or data flow starting or ending information corresponding to the service application type.

Particularly, the TDF can be a traffic detection function entity, or a call session control application server for providing data flow information or other application server, and the present invention is not limited thereto, as long as data flow description information can be provided to a policy and charging rule function entity.

S102, Receiving, transmitted by the TDF, the detected data flow description corresponding to the service application type or a data flow starting or ending information report corresponding to the service application type, and generating a data packet marking rule according to the data flow description corresponding to the service application type or the data flow starting or ending information report corresponding to the service application type.

The receiving, transmitted by the TDF, the detected data flow description corresponding to the service application type or the data flow starting or ending information report corresponding to the service application type, can be achieved by receiving a session establishment reply message transmitted by the TDF to the policy and charging rule function PCRF; where the session establishment reply message can carry the data flow description corresponding to the service application type or the data flow starting or ending information report corresponding to the service application type, so as to prompt the PCRF that the data flow corresponding to the service application type or the data flow starting or ending information report corresponding to the service application type has been detected.

In particular, the PCRF generates the data packet marking rule after the PCRF receives a message containing the data flow description of the detected data flow corresponding to the service application type, or after the PCRF receives the data flow starting or ending report of the data flow corresponding to the service application type.

Particularly, the data packet marking rule is for prompting the bearer binding function entity BBF to mark the corresponding data flow.

S103, Transmitting, to the bearer binding function entity (BBF), a session modification message carrying the data packet marking rule, so that the BBF can map a data flow identified by the session modification message to a bearer according to the session modification message, and mark a GPRS tunneling protocol-user plane GTP-U header according to the data packet marking rule.

Figure 2:
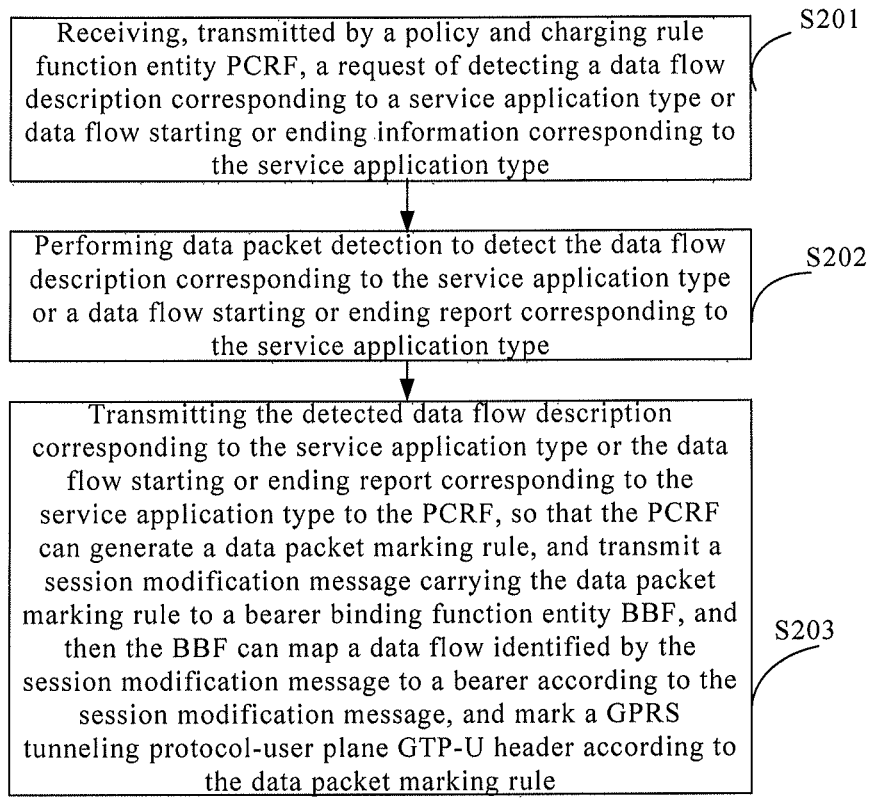
FIG. 2 is a flowchart of a method for marking a service data packet according to another embodiment of the present invention.

A method for marking a service data packet according to another embodiment of the present invention is applied in a case of providing data flow and application information by an external TDF or an application server, as shown in FIG. 2, the method includes:

S201, Receiving, transmitted by a policy and charging rule function PCRF, a request of detecting a data flow description corresponding to a service application type or data flow starting or ending information corresponding to the service application type.

S202, Performing data packet detection to detect the data flow description corresponding to the service application type or a data flow starting or ending report corresponding to the service application type.

S203, Transmitting the detected data flow description corresponding to the service application type or the data flow starting or ending report corresponding to the service application type to the PCRF, so that the PCRF can generate a data packet marking rule, and transmit a session modification message carrying the data packet marking rule to a bearer binding function BBF entity, and then the BBF can map a data flow identified by the session modification message to a bearer according to the session modification message, and mark a GPRS tunneling protocol-user plane GTP-U header according to the data packet marking rule.

Figure 3:
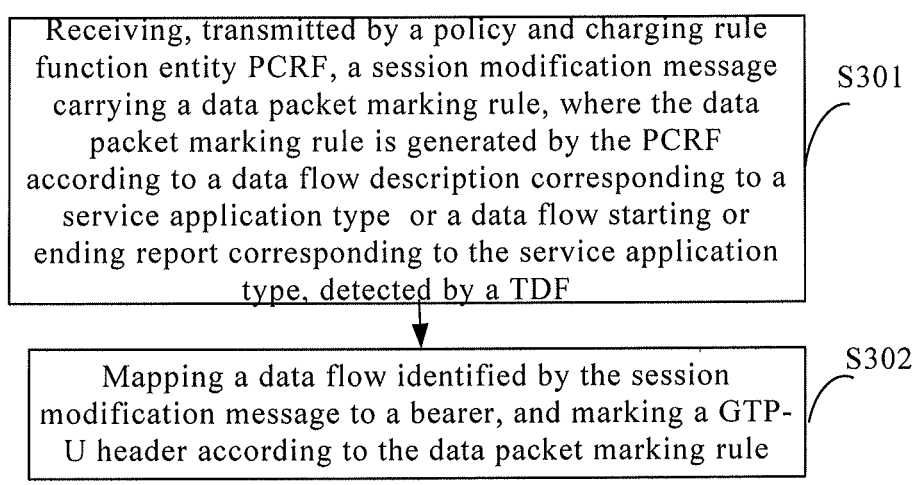
FIG. 3 is a flowchart of a method for marking a service data packet according to another embodiment of the present invention.

A method for marking a service data packet according to still another embodiment of the present invention is applied in a case of providing data flow and application information by an external TDF or an application server, as shown in FIG. 3, the method includes:

S301, Receiving, transmitted by a policy and charging rule function entity PCRF, a session modification message carrying a data packet marking rule, where the data packet marking rule is generated by the PCRF according to a data flow description corresponding to a service application type or a data flow starting or ending report corresponding to the service application type, detected by a TDF.

S302, Mapping a data flow identified by the session modification message to a bearer, and marking a GTP-U header according to the data packet marking rule.

Embodiments of the present invention provide a method for marking a service data packet, a session establishment request message carrying the data packet marking rule is transmitted to the bearer binding function entity, so that the bearer binding function entity can map the data flow identified by the session modification message to the appropriate bearer according to the session modification message, and mark the GTP-U header according to the data packet marking rule; in view of a case that the base station needs to add a data packet detection function on the PCEF for identifying target service data in the prior art, technical solutions of the present invention allow the base station to identify target service data and achieve a differentiated scheduling when the data packet arrives at the base station in a case that the PCEF does not possess the data packet detection function, so that the user experience can be improved.

A method for marking a service data packet according to still another embodiment of the present invention is applied in a case of providing data flow and application information by an external TDF or an application server, and is described by way of taking a PCRF as a policy and charging rule function entity, taking the TDF as a traffic detection function entity, and taking a PCEF or BBERF (Bearer Binding and Event Reporting Function, bearer binding and event reporting function entity) as a bearer binding function entity.

It should be noted that, the traffic detection function entity not only can be a TDF, but also can be an AF or P-CSCF application server or other entity, as long as data flow description (information) can be provided, and the present invention is not limited thereto.

Figure 4:
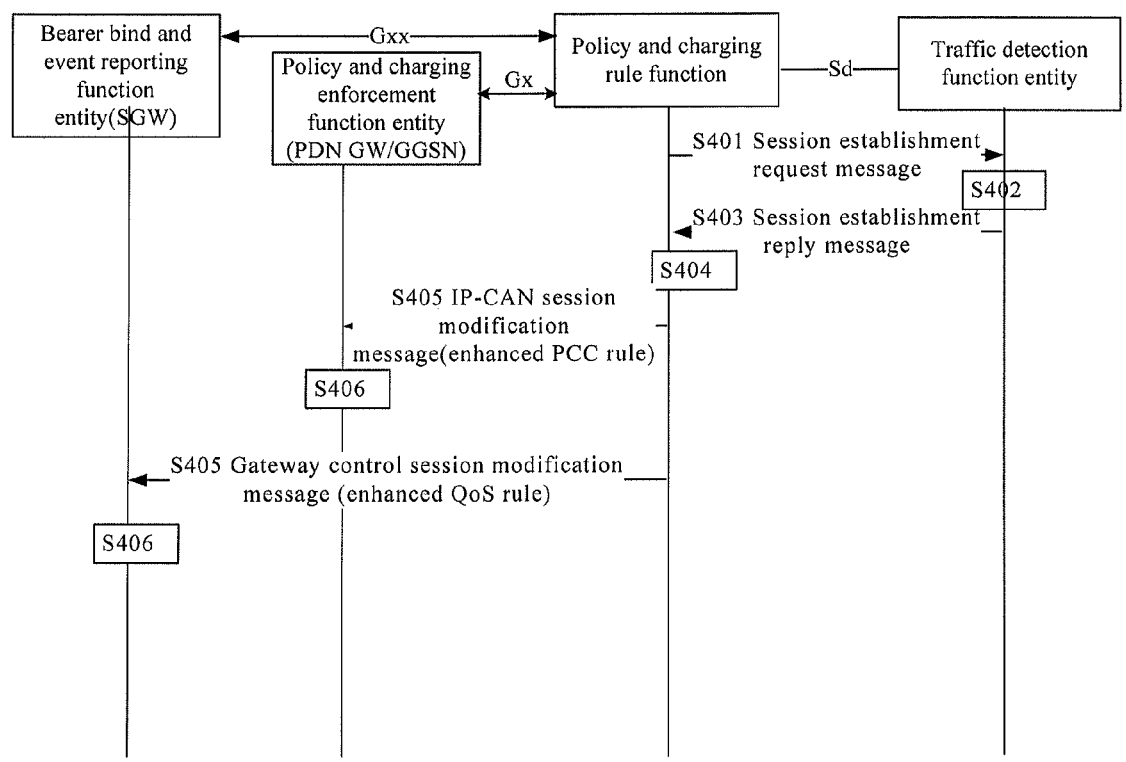
FIG. 4 is a flowchart of a method for marking a service data packet according to another embodiment of the present invention.

As shown in FIG. 4, the method includes steps as follows:

S401, The PCRF transmits a session establishment request message to the TDF.

The request message carries an identifier corresponding to a service application type, to request the TDF to perform detection to a data packet corresponding to the service application type.

It should be noted that, if the traffic detection function entity is an AF or P-CSCF application server, the AF or P-CSCF application server does not need to receive the session establishment request message transmitted by the PCRF to the AF or P-CSCF, the AF or P-CSCF can directly perform step S402, that is, the AF or P-CSCF itself can spontaneously initiate detection to a data packet corresponding to the service application type, to obtain a data flow description of the detected data packet corresponding to the service application type or a starting or ending report of the data packet corresponding to the service application type, and perform steps S403-S406.

S402, The TDF performs detection to the data packet of the data flow corresponding to the service application type, to obtain a data flow description of the data packet corresponding to the service application type.

For example, the TDF performs detection to a QQ service data packet, to obtain the data flow description of the QQ service data packet, where the data flow description is description information of the data flow associated with an application identifier (Application Id).

S403, The TDF returns a session establishment reply message to the PCRF.

The TDF returns the session establishment reply message to the PCRF after detecting the data flow description of the data packet corresponding to the service application type.

The data flow description of the detected data packet corresponding to the service application type or the starting or ending report of the detected data packet of the service application type can be carried in the session establishment reply message and transmitted to the policy and charging rule function entity.

Moreover, after the session is established, the traffic detection function entity also can transmit the data flow description of the detected data packet corresponding to the service application type or the starting or ending report of the detected data packet corresponding to the service application type to the policy and charging rule function entity.

In particular, if the TDF fails to detect the data flow description of the data packet corresponding to the service application type or the starting or ending report of the detected data packet corresponding to the service application type after detecting the data flow description of the data packet corresponding to the service application type or the starting or ending report of the data packet corresponding to the service application type in step S402, the TDF can directly return the session establishment reply message to the PCRF, to prompt the PCRF that the TDF has performed detection to the data flow description of the data packet corresponding to the service application type or the starting or ending report of the detected data packet corresponding to the service application type, and step S404 can be performed, that is, to generate corresponding enhanced PCC rule or enhanced QoS rule, thereafter, the TDF can continue to perform detection to the data flow description of the data packet corresponding to the service application type or the starting or ending report of the detected data packet corresponding to the service application type, and transmit the data flow description of the data packet corresponding to the service application type or the starting or ending report of the detected data packet corresponding to the service application type to the PCRF after the data flow description of the data packet corresponding to the service application type or the starting or ending report of the detected data packet corresponding to the service application type is detected.

The data flow description of the detected data packet corresponding to the service application type includes: an application identifier and a description of the data flow corresponding to the application identifier.

S404, The PCRF generates a data packet marking rule after receiving the session establishment reply message.

In particular, the PCRF generates the data packet marking rule after the PCRF receives the session establishment reply message carrying the data flow description of the detected data flow corresponding to the service application type, or after the policy and charging rule function entity receives the starting or ending report of the detected data flow corresponding to the service application type.

The generated data packet marking rule includes:

in a case of a GTP protocol, the BBF is a PCEF, an IP connectivity access network IP-CAN session modification message carrying an enhanced PCC rule is transmitted to the PCEF, so that the PCEF entity can select a bearer according to the enhanced PCC rule, map the data flow identified by the enhanced PCC rule to the selected bearer, and mark a GTP-U header;

That is, if the type of the protocol between a PDN GW and a Serving GW is a GTP protocol, the PCRF can generate the enhanced PCC rule after receiving the session establishment reply message. or In a case of a PMIP protocol, the BBF is a bearer binding and event reporting function BBERF, a gateway control session modification message carrying an enhanced QoS rule is transmitted to the BBERF, so that the BBERF can select a bearer according to the enhanced QoS rule, map the data flow identified by the enhanced QoS rule to the selected bearer, and mark the GTP-U header;

That is, if the type of the protocol between a PDN GW and a Serving GW is a PMIP protocol, the PCRF can generate the enhanced QoS rule after receiving the session establishment reply message.

Further, the enhanced PCC rule is formed by adding a new element to a PCC rule, for prompting the PCEF to mark the GTP-U header for the data flow identified by the enhanced PCC rule.

In particular, the new element added in the PCC rule can be a data marking, which can be an application type or application class value marking of the data packet, and a cell of the data marking is to transfer a message through which the PCRF guides the PCEF to mark the data packet header for the target data flow.

In particular, if there is a need to mark with the application type of the data packet, a service identifier field in the existing PCC rule can be reused, or a new application type identifier can be added; for example, if there is a need to mark with a class value corresponding to the detected QQ service data packet, new fields, such as a Service class Value, need to be added in the PCC rule, to identify a class identifier of the current data packet, and the PCEF makes a certain conversion or directly uses as a class marking of the GTP-U header according to the identifier.

It should be noted that, the certain conversion made by the PCEF according to the identifier is to correspond the class identifier of the current data packet identified by the newly added Service class Value in the PCC rule one by one to the GTP-U header marking according to a certain corresponding relationship. That is, A can be corresponded to A1 according to a certain corresponding relationship.

The enhanced PCC rule also can be formed by adding a data marking (Data marking) in the existing PCC rule, or adding other marking, such as adding the Service class Value in the PCC rule, that is, the application class value corresponding to the data packet, accordingly, when the PCEF is triggered after receiving the PCC rule containing the Service class Value, the PCEF marks the GTP-U header for the data flow marked by the enhanced PCC rule.

It should be noted that, the PCC rule also can use other markings different from the Data marking or the Service class Value, as long as the marking can instruct the PCEF to mark the GTP-U header for the data flow of the QQ service data packet, and the present invention is not limited thereto.

Further, the enhanced QoS rule is formed by adding a new element to a QoS rule, for prompting the BBERF to mark the GTP-U header for the data flow identified by the enhanced QoS rule.

In particular, the new element added in the QoS rule can be a data marking, a cell of the data marking is to transfer a message through which the PCRF guides the PCEF to mark the data packet header for a target data flow, and this marking can be an application type or application class value marking of the data packet, such as marked as X.

In particular, the new element added in the QoS rule can be a service type marking or a service class value, or a name marking, such as an application class value marking corresponding to the data packet, accordingly, when the BBERF receives the QoS rule containing the application class value marking corresponding to the data packet, the BBERF makes a certain conversion or directly uses as a class marking of the GTP-U header according to the identifier.

It should be noted that, the certain conversion made by the PCEF according to the identifier is to correspond the class identifier of the current data packet identified by the newly added application class field in the QoS rule one by one to the GTP-U header marking according to a certain corresponding relationship. That is, B can be corresponded to B1 according to a certain corresponding relationship.

Moreover, the QoS rule can be enhanced by a marking, for example, the QoS rule adds the service class value, namely, an application class value corresponding to the data packet, accordingly, when the BBERF receives the QoS rule containing the service class value, the BBERF triggers to mark the GTP-U header for the data flow marked by the enhanced QoS rule.

It should be noted that, the QoS rule also can use other markings, as long as the marking can instruct the PCEF to mark the GTP-U header for the data flow of the QQ service data packet, and the present invention is not limited thereto.

Even further, the application class value corresponding to the data packet is a comprehensive class information value, not only including a class value of a certain application, but also including subscription information of the user, and etc., for example, if the current user is a subscriber of Skype, a higher class can be provided for the Skype service of the user, and an ordinary class can be provided properly for a Skype-unsubscribed user; further, the application class value corresponding to the data packet also includes: the type of a user terminal, a time period factor, and a network condition factor, etc., and one or more of the above factors are comprehensive factors which can be referenced by the access network.

Further, the PCRF further can instruct the PECF to start to mark with the application type or the application class value of the data packet or stop marking with the application type or the application class value of the data packet through the extended PCC or QoS rule. The PCC rule is added with a new information field, data packet marking status (data marking status), which can be start or stop. When it indicates start, the PCEF opens the GTP-U marking (data marking) for the target data flow; when it indicates stop, the PCEF closes the GTP-U marking for the target data flow, and the base station carries out non-differentiated processing to these data packets. Such stop or start can be triggered by one or more conditions illustrated below, for example:

1. The PCRF triggers according to network conditions (for example, when an access network cell is congested, open the data packet marking of a relevant application; while the access network cell is light loaded, close the data packet marking of the relevant application).

2. The PCRF triggers according to the detected starting or stopping of the service application type reported by the TDF entity, when the TDF entity reports the starting of a QQ application, the PCRF generates the data packet marking rule to trigger the PCEF or the BBERF to mark the GTP-U header for the data packet of the QQ application; when the TDF entity reports the stopping of the QQ application, the PCRF correspondingly generates the data packet marking rule, and then notifies the PCEF or the BBERF to relieve or close the marking function for the data flow of the QQ application, and at this time, the PCEF or the BBERF does not need to check one by one whether a user plane data flow of a mobile terminal has a data packet with DSCP=x. Such can prevent the PCEF or the BBERF from performing additional processing of checking one by one all the data packets of the mobile terminal when the QQ application data flow has not appeared, thereby saving network resources.

3. The PCRF triggers the opening or closing of GTP-U marking functions of the relevant application on the PCEF or BBERF, due to user subscription change. For example, a certain user changes from a subscriber of Skype to an unsubscribed user, then the PCRF needs to trigger update of a marking policy of a policy on a Gx/Gxx interface, and such update includes starting, stopping, change of marking class, and etc.

4. The PCRF starts or stops GTP-U marking functions of the relevant application on the PCEF or BBERF, according to the change of an operator policy on itself.

5. The PCRF triggers update of a marking policy of a policy on a Gx/Gxx interface, according to user account information (for example, via interaction between the PCRF and an online charging system OCS), and such update includes starting, stopping, change of marking class, and etc.

S405, The PCRF transmits the session modification message carrying the data packet marking rule to the bearer binding function entity.

Further, in the case of the GTP protocol, the PCRF transmits an IP connectivity access network session modification request message carrying the enhanced PCC rule to the policy and charging enforcement function entity via the interface Gx between the PCRF and the policy and charging enforcement function entity.

Moreover, in the case of the PMIP protocol, the PCRF transmits a gateway control session modification message carrying the enhanced QoS rule to the bearer binding and event reporting function entity via the interface Gxx between the PCRF and the bearer binding and event reporting function entity.

The enhanced PCC rule or enhanced QoS rule further includes data flow description information. The PCRF indicates an object to be operated by the data packet marking operation to the bearer binding function entity through the enhanced PCC rule or enhanced QoS rule, that is, to instruct to mark the data packet GTP-U header for which target data flow.

S406, The bearer binding function entity maps the data flow identified by the session modification message to a bearer according to the session modification message, and marks the GTP-U header according to the data packet marking rule.

Preferably, the bearer binding function entity maps the data identified by the session modification message to a QoS class identifier (QCI) or an ARP bearer according to the session modification message, and marks the GTP-U header according to the data packet marking rule.

Further, in the case of the GTP protocol, the BBF is a PCEF, an IP connectivity access network IP-CAN session modification message carrying the enhanced PCC rule is transmitted to the PCEF, so that the PCEF entity can select a bearer according to the enhanced PCC rule, map the data flow identified by the enhanced PCC rule to the selected bearer, and mark the GTP-U header.

Moreover, in the case of the PMIP protocol, the BBF is a bearer binding and event reporting function BBERF, a gateway control session modification message carrying the enhanced QoS rule is transmitted to the BBERF, so that the bearer binding and event reporting function entity BBERF can select a bearer according to the enhanced QoS rule, map the data flow identified by the enhanced QoS rule to the selected bearer, and mark the GTP-U header.

Embodiments of the present invention provide a method for marking a service data packet, the session establishment request or modification request message carrying the data packet marking rule is transmitted to the bearer binding function entity, so that the bearer binding function entity can map the data flow identified by the request message to the appropriate bearer according to the session establishment request or modification request message, and mark the GTP-U header according to the data packet marking rule; in view of a case that the base station needs to add a data packet detection function on the PCEF for identifying target service data in the prior art, technical solutions of the present invention allow the base station to identify target service data and achieve a differentiated scheduling when the data packet arrives at the base station in a case that the PCEF does not possess the data packet detection function, so that the user experience can be improved.

A method for marking a service data packet according to still another embodiment of the present invention is applied in a case of providing data flow and application information by an external TDF or an application server, and is described by way of taking a PCRF as a policy and charging rule function entity, taking the TDF as a traffic detection function entity, and taking a PCEF or BBERF as a bearer binding function entity.

It should be noted that, the traffic detection function entity not only can be a TDF, but also can be an AF or P-CSCF application server or other entity, as long as data flow description information (such as five-element group information consisting of an IP address, a port number and a protocol type, or information marked with DSCP, or in other manners) can be provided, and the present invention is not limited thereto.

Figure 5:
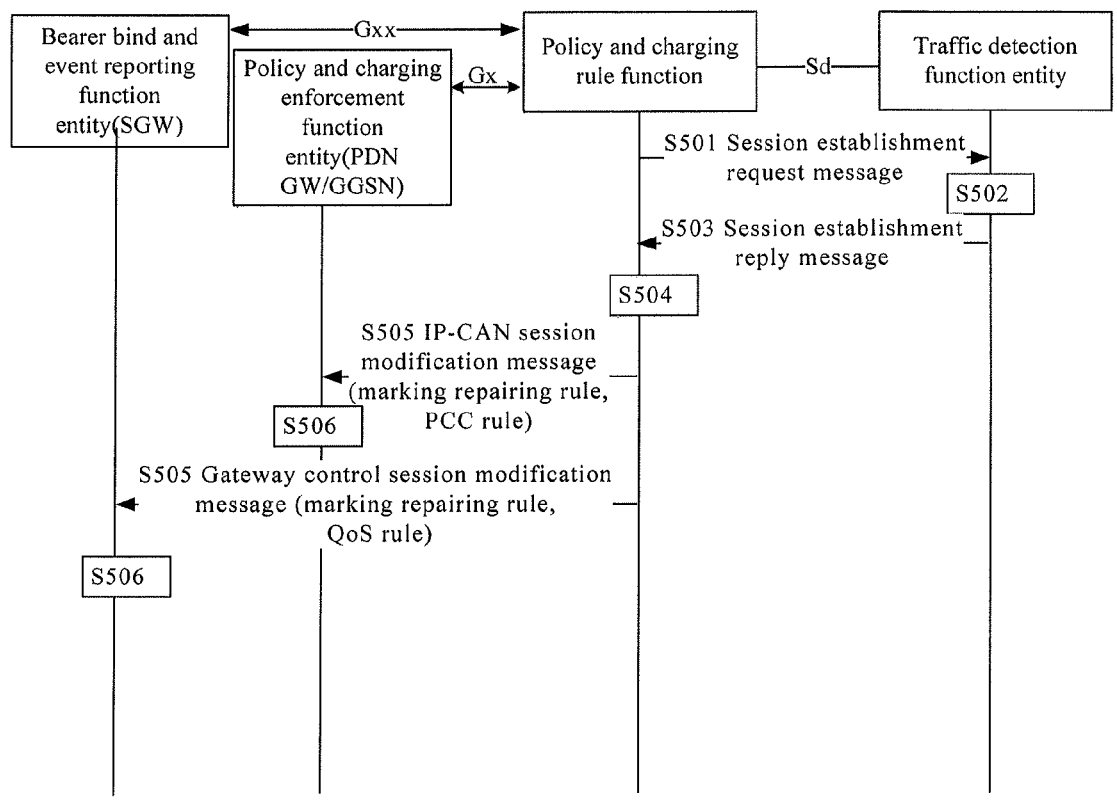
FIG. 5 is a flowchart of a method for marking a service data packet according to another embodiment of the present invention.

As shown in FIG. 5, the method includes steps as follows:

S501, The PCRF transmits a session establishment request message to the TDF, to request the TDF to detect a data flow corresponding to a service application type.

It should be noted that, if the traffic detection function entity is an AF or P-CSCF application server, the AF or P-CSCF application server does not need to receive the session establishment request message transmitted by the PCRF to the AF or P-CSCF, the AF or P-CSCF can directly perform step S502, that is, the AF or P-CSCF itself can spontaneously initiate detection to a data packet corresponding to the service application type, to obtain a data flow description of the detected data packet corresponding to the service application type or a starting or ending report of the data packet corresponding to the service application type, and perform steps S503-S506.

S502, The TDF performs detection to the data packet corresponding to the service application type, to obtain the data flow description of the data packet corresponding to the service application type.

For example, the TDF performs detection to a QQ service data packet, to obtain the data flow description of the QQ service data packet, where the data flow description includes an application identifier, a description of the data flow, and so on.

S503, The TDF returns a session establishment reply message to the PCRF.

The TDF returns the session establishment reply message to the PCRF after detecting the data flow description of the data packet corresponding to the service application type.

The data flow description of the detected data packet corresponding to the service application type or the starting or ending report of the detected data packet corresponding to the service application type can be carried in the session establishment reply message and transmitted to the policy and charging rule function entity.

Moreover, after the session is established, the traffic detection function entity also can transmit the data flow description of the detected data packet corresponding to the service application type or the starting or ending report of the data packet corresponding to the service application type to the policy and charging rule function entity.

In particular, if the TDF fails to detect the data flow description of the data packet corresponding to the service application type or the starting or ending report of the data packet corresponding to the service application type after detecting the data flow description of the data packet corresponding to the service application type or the starting or ending report of the detected data packet corresponding to the service application type in step S502, the TDF can directly return the session establishment reply message to the PCRF, to prompt the PCRF that the TDF has performed detection to the data flow description of the data packet corresponding to the service application type or the starting or ending report of the detected data packet of the service application type, and step S504 can be performed, that is, to generate corresponding enhanced PCC rule or enhanced QoS rule, thereafter, the TDF can continue to perform detection to the data flow description of the data packet corresponding to the service application type or the starting or ending report of the detected data packet corresponding to the service application type, and transmit the data flow description of the data packet corresponding to the service application type or the starting or ending report of the detected data packet corresponding the service application type to the PCRF after the data flow description of the data packet corresponding to the service application type or the starting or ending report of the detected data packet corresponding to the service application type is detected.

The data flow description of the detected data packet corresponding to the service application type includes: an application identifier and a description of the data flow corresponding to the application identifier.

S504, The PCRF generates a perfecting and repairing rule after receiving the session establishment reply message or the starting or ending report of the data packet corresponding to the application type.

Particularly, in a case of a GTP protocol, the BBF is a PCEF, an IP-CAN session modification message carrying the perfecting and repairing rule and a PCC rule is transmitted to the PCEF, so that the PCEF can select a bearer according to the PCC rule, map the data flow identified by the PCC rule to the selected bearer, and mark a GTP-U header for the data flow identified by the perfecting and repairing rule according to the perfecting and repairing rule. or In a case of a PMIP protocol, the BBF is a BBERF, a gateway control session modification message carrying the perfecting and repairing rule and a QoS rule is transmitted to the BBERF, so that the BBERF can select a bearer according to the QoS rule, map the data flow identified by the QoS rule to the selected bearer, and mark a GTP-U header for the data flow identified by the perfecting and repairing rule according to the perfecting and repairing rule.

Further, the perfecting and repairing rule is formed by including one or more elements in the repairing rule, to prompt, according to the perfecting and repairing rule, the PCEF to mark the GTP-U header for the data flow identified by the perfecting and repairing rule.

Moreover, the perfecting and repairing rule is formed by including one or more elements in the repairing rule, to prompt, according to the perfecting and repairing rule, the BBERF to mark the GTP-U header for the data flow identified by the perfecting and repairing rule.

Illustratively, data flow description information is included in the perfecting and repairing rule, to prompt the policy and charging enforcement function entity to perform processing of the GTP-U header marking for the data flow corresponding to the data flow description information in the perfecting and repairing rule.

Illustratively, an application type or application class value marking is included in the perfecting and repairing rule, to prompt the policy and charging enforcement function entity to mark the GTP-U header with the application type or the application class value of the data flow for the data flow identified by the perfecting and repairing rule.

Illustratively, the data flow description information is included in the perfecting and repairing rule, to prompt the bearer binding and event reporting function entity to perform the processing of the GTP-U header marking for the data flow corresponding to the data flow description information in the perfecting and repairing rule.

Illustratively, a service type or application class value marking is included in the perfecting and repairing rule, to prompt the bearer binding and event reporting function entity to mark the GTP-U header with the service type or the application class value of the data flow for the data flow identified by the perfecting and repairing rule.

Optionally, the new element added in the perfecting and repairing rule can be a data marking, a cell of the data marking is to transfer a message through which the PCRF guides the PCEF/BBERF to mark the data packet header for the target data flow, and the marking can be the application type or application class value marking of the data packet.

In particular, if there is a need to mark with the application type of the data packet, a service identifier field in the existing repair rule can be reused, or a new application type identifier can be added; if there is a need to mark with a class value corresponding to the detected QQ service data packet, new fields, such as a Service class Value, need to be added in the perfecting and repairing rule, to identify a class identifier of the current data packet, and the PCEF/BBERF makes a certain conversion or directly uses as a class marking of the GTP-U header according to the identifier.

The perfecting and repairing rule also can add a data marking or other marking, such as the perfecting and repairing rule adds a Service class Value, that is, the application class value corresponding to the data packet, or adds a service identifier or an application ID, in this way, after the PCEF/BBERF receives the perfecting and repairing rule including the Service class Value or the service identifier or the Application ID, the PCEF/BBERF triggers to mark the GTP-U header for the data flow marked by the perfecting and repairing rule.

It should be noted that, the perfecting and repairing rule also can use other rule name, as long as the rule is to instruct the PCEF/BBERF to mark the GTP-U header for the data flow of the QQ service data packet, and the present invention is not limited thereto.

Even further, the application class value corresponding to the data packet is one comprehensive class value which not only includes a class value of a certain application, but also includes factors such as subscription information of the user; for example, if the current user is a subscriber of Skype, a higher class can be provided for the Skype service of the user relative to a Skype-unsubscribed user, and an ordinary class can be provided for the Skype-unsubscribed user; further, the application class value corresponding to the data packet also includes: the type of a user terminal, and factors, such as a time period factor, and a network condition factor. And one or more of the above factors are comprehensive factors which can be referenced by a policy and charging rule function entity to guide the bearer binding function entity to mark the GTP-U header, and thereby the comprehensive class value is taken by an access network node as a class scheduling factor.

Further, the PCRF further can instruct the PECF or the BBERF to start to mark with the application type or the application class value of the data packet or stop marking with the application type or the application class value of the data packet through the perfecting and repairing rule. The perfecting and repairing rule is added with a new information field, a data packet marking status (data marking status), which can be start or stop. When it indicates start, the PCEF or BBERF opens the GTP-U marking (data marking) for the target data flow; when it indicates stop, the PCEF or BBERF closes the GTP-U marking for the target data flow, and the base station carries out non-differentiated processing to these data packets. Such stop or start can be triggered by one or more conditions illustrated below, for example:

1. The PCRF triggers according to network conditions.

For example, when an access network cell is congested, open the data packet marking of a relevant application; while the access network cell is light loaded, close the data packet marking of the relevant application.

2. The PCRF triggers according to the detected starting or stopping of the service type reported by the TDF entity, when the TDF entity reports the starting of a QQ application, the PCRF generates a data packet marking rule to trigger the PCEF or the BBERF to mark the GTP-U header for the data packet of the QQ application; when the TDF entity reports the stopping of the QQ application, the PCRF correspondingly generates the data packet marking rule, and then notifies the PCEF or the BBERF to relieve or close the marking function for the data flow of the QQ application, and such can prevent the PCEF or the BBERF from performing additional processing.

3. The PCRF triggers the opening or closing of GTP-U marking functions of the relevant application on the PCEF or BBERF, due to user subscription change.

For example, a certain user changes from a subscriber of Skype to an unsubscribed user, then the PCRF needs to trigger update of a marking policy of a policy on a Gx/Gxx interface, and such update includes starting, stopping, change of marking class, and etc.

4. The PCRF starts or stops GTP-U marking functions of the relevant application on the PCEF or BBERF, according to the change of an operator policy on the PCRF.

5. The PCRF triggers update of a marking policy of a policy on a Gx/Gxx interface, according to user account information (for example, via interaction between the PCRF and an online charging system OCS), and such update includes starting, stopping, change of marking class, and etc.

S505, The PCRF transmits the session modification message carrying the perfecting and repairing rule and a PCC rule or carrying the perfecting and repairing rule and a QOC rule to the bearer binding function entity.

Further, if the type of the protocol between a PDN GW and a Serving GW is a GTP protocol, in the case of the GTP protocol, the BBF is a PCEF, an IP-CAN session modification message carrying the perfecting and repairing rule and the PCC rule is transmitted to the PCEF, so that the PCEF can select a bearer according to the PCC rule, map the data flow identified by the PCC rule to the selected bearer, and mark the GTP-U header for the data flow identified by the perfecting and repairing rule according to the perfecting and repairing rule; or Moreover, if the type of the protocol between the PDN GW and the Serving GW is a PMIP protocol, in the case of the PMIP protocol, the BBF is a BBERF, a gateway control session modification message carrying the perfecting and repairing rule and the QoS rule is transmitted to the BBERF, so that the BBERF can select a bearer according to the QoS rule, map the data flow identified by the QoS rule to the selected bearer, and mark the GTP-U header for the data flow identified by the perfecting and repairing rule according to the perfecting and repairing rule.

S506, The bearer binding function entity maps the data flow identified by the session modification message to an appropriate bearer according to the session modification message, and marks the GTP-U header.

After the bearer binding function entity receives the session modification message carrying the perfecting and repairing rule and the PCC rule or carrying the perfecting and repairing rule and the QoS rule transmitted by the PCRF, the bearer binding function entity maps the data flow identified by the session modification message to the appropriate bearer according to the session modification message, and marks the GTP-U header.

Further, in the case of the GTP protocol, the PCEF maps the data flow identified by the PCC rule to the appropriate bearer according to the PCC rule, and marks the GTP-U header for the data flow identified by the perfecting and repairing rule according to the perfecting and repairing rule.

Moreover, in the case of the PMIP protocol, the BBERF maps the data flow identified by the QoS rule to the appropriate bearer according to the QoS rule, and marks the GTP-U header to the data flow identified by the perfecting and repairing rule according to the perfecting and repairing rule.

Embodiments of the present invention provide a method for marking a service data packet, the session establishment request message carrying the data packet marking rule is transmitted to the bearer binding function entity, so that the bearer binding function entity can map the data flow identified by the data packet marking rule to the appropriate bearer according to the data packet marking rule, and mark the GTP-U header with the data flow description; in view of a case that the base station needs to add a data packet detection function on the PCEF for identifying target service data in the prior art, technical solutions of the present invention allow the base station to identify target service data and achieve a differentiated scheduling when the data packet arrives at the base station in a case that the PCEF does not possess the data packet detection function, so that the user experience can be improved.

A method for marking a service data packet according to still another embodiment of the present invention is applied in a case of providing data flow and application information by an external TDF or an application server, and is described by way of taking a PCRF as a policy and charging rule function entity, taking the TDF as a traffic detection function entity, and taking a PCEF or BBERF as a bearer binding function entity.

It should be noted that, the traffic detection function entity not only can be a TDF, but also can be an AF or P-CSCF application server or the other, as long as a data flow description can be provided, and the present invention is not limited thereto.

Figure 6:
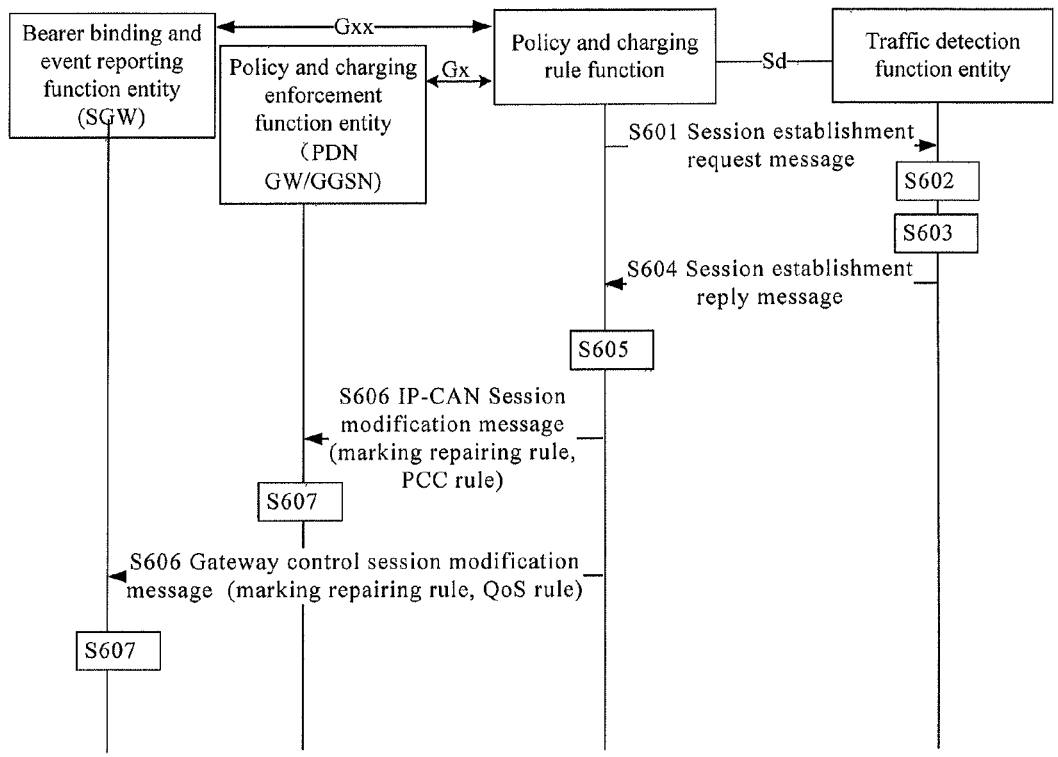
FIG. 6 is a flowchart of a method for marking a service data packet according to another embodiment of the present invention.

As shown in FIG. 6, the method includes steps as follows:

S601, The PCRF transmits a session establishment request message to the TDF, to request the TDF to detect a data flow corresponding to a service application type.

For example, the service application type can correspond to a P2P application type.

S602, The TDF performs detection to a data packet.

For example, the TDF performs detection to all the data packets of an IP-CAN bearer, to detect the data flow of the P2P service.

S603, The TDF detects the data flow of the detected data packet corresponding to the service application type, and marks a differentiated services code point to an IP header of the detected data packet corresponding to the service application type.

It should be noted that, the TDF performs detection to the P2P service data packet, after the P2P service data packet is detected, the TDF cannot report the data flow description of the P2P application timely since the data flow description information of the P2P service data packet changes very quickly, for example, the TDF is just ready for reporting the description information of the P2P data flow, but finds in two seconds that the description information of the P2P data flow changes again, and therefore, the TDF initiates to mark the DSCP to the IP header of the detected data packet corresponding to the service application type.

Further, the DSCP marking can be data flow class information of the detected data packet of the service application type, returned by the PCRF and received by the TDF.

For example, the PCRF issues an ADC rule, and meanwhile issues a class value corresponding to the Application ID, i.e., a DSCP value.

Or, the TDF presets the data flow class information of the detected data packet of the service application type.

Further, the TDF marks the DSCP to the IP header of the data of the detected data flow of the data packet corresponding to the service application type, which includes:

marking the DSCP of the IP header of the data of the data flow of the data packet corresponding to the P2P application type as X. or, marking the DSCP of the IP header of the data of the data flow of the data packet corresponding to the P2P application type as X, and converting the DSCP of the IP header of the data packet corresponding to other application type to a non-X value, such as Y value.

It should be noted that, the DSCP class value is one comprehensive class value which not only includes a class value of a certain application, but also includes subscription information of the user or the type of a terminal, and factors, such as a time period factor, and a network condition factor. For example, if the current user is a subscriber of Skype, a higher Skype service class can be provided for the user, and an ordinary class and the type of the user terminal can be provided for the Skype-unsubscribed user; for example, a higher http browsing class can be provided for a user of a mobile handheld terminal, and for a terminal application of a data card type, an ordinary http browsing class and factors, such as a time period factor and a network condition factor, are provided. One or more of the above factors are a comprehensive factor which can be referenced by a network, such as a base station.

S604, The traffic detection function entity returns a session establishment reply message to the PCRF.

The traffic detection function entity returns the session establishment reply message to the PCRF to notify the PCRF that the TDF has received the instruction for performing the traffic detection, when the starting or ending report of the data packet corresponding to the service application type is carried in the session establishment reply message, the session establishment reply message implicitly notifies the PCRF to perform step S605, that is, generating a data packet marking rule.

The starting or ending report of the detected data packet corresponding to the service application type can be carried in the session establishment reply message and transmitted to the policy and charging rule function entity.

Moreover, after the session is established, the traffic detection function entity also can transmit the starting or ending report of the detected data packet of the service application type to the policy and charging rule function entity.

S605, The PCRF generates the data packet marking rule after receiving the session establishment reply message or the starting or ending report of the data packet corresponding to the service application type.

If the type of the protocol between a PDN GW and a Serving GW is a GTP protocol, the PCRF generates an enhanced PCC rule after receiving the session establishment reply message.

Or, if the type of the protocol between a PDN GW and a Serving GW is a PMIP protocol, the PCRF generates an enhanced QoS rule after receiving the session establishment reply message.

Further, the enhanced PCC rule is formed by adding a new element to a PCC rule, for prompting the PCEF to mark a GTP-U header for the data flow identified by the enhanced PCC rule.

Optionally, the new element added in the PCC rule can be a data marking, a cell of the data marking is to transfer a message through which the PCRF guides a policy and charging enforcement function entity to mark a data packet header for the target data flow, and the marking can be an application type or application class value marking of the data packet.

Illustratively, it can be indicated in a class rule field of the PCC rule that the class of the PCC rule corresponding to the data flow description of DSCP=X is the lowest, so as to guarantee that a data packet with stable data flow description will not fall in a filter of this rule, and the filter can be identified by a service data flow template. It should be noted that, the Service data flow template is a filter, the reason for designing a Class value to be the lowest or next lower is to obtain target service data to a maximum extent. If there is a wildcard filter (wildcard filter), then it is defined that the class in this PCC rule is merely higher than that of the wildcard filter.

Moreover, the Service data flow template in the enhanced PCC/QoS rule is to form a new filter, and the enhanced PCC/QoS rule is only identified by a DSCP value, without other identification information, such as an IP address and a port.

For example, mark a filter corresponding to DSCP=X as G; mark a filter corresponding to DSCP=Y as H, that is because the Class value of the class field corresponding to the P2P data flow is the lowest, or only higher than that of the wildcard filter.

Illustratively, under a scenario of adopting the DSCP marking method A, the DSCP marking on the TDF only processes the data of the P2P application to allow DSCP=X, without processing the IP header of the data packet corresponding to other non-P2P application, however, in order to avoid that a DSCP marking of the IP header of other non-P2P application also equals to X, here, a corresponding enhanced PCC rule can be adopted to allow the data packets which satisfy the filtering rule, that is, the IP address and port number and DSCP=X, are preferentially processed, and the PCEF/BBERF performs GTP-U header encapsulating and mapping of the data packet satisfying the filtering rule to a bearer, and marks the GTP-U header with class based on the DSCP value.

Further, the PCC rule can be added with a data making transfer field or other name marking, once the instruction is received, the PCEF will perform the conversion from the DSCP value to the GTP-U header marking for the target data flow taking the service data flow template as identification.

Optionally, there can also be no explicit identifier, and it can be marked with a feature that the filter in the Service data flow template (service data flow template) does not include other IP addresses and port elements but only includes a DSCP value, when the PCEF receives in the PCC rule that the filter in the service data flow template) does not include other IP addresses and port elements but only includes the DSCP value, the PCEF initiates the conversion from the DSCP value to the GTP-U header marking, so as to perform the GTP-U marking for the target data packet taking the service data flow template as identification.

Further, the PCRF further can instruct the PECF to start to mark with an application type or an application class value of the data packet or stop marking with the application type or the application class value of the data packet through the extended PCC or QoS rule. The PCC rule is added with a new information field, a data packet marking status (data marking status), which can be start or stop. When it indicates start, the PCEF opens the GTP-U marking (data marking) for the target data flow; when it indicates stop, the PCEF closes the GTP-U marking for the target data flow, and the base station carries out non-differentiated processing to these data packets. Such stop or start can be triggered by one or more conditions illustrated below, for example:

1. The PCRF triggers according to network conditions (for example, when an access network cell is congested, open the data packet marking of a relevant application; while the access network cell is light loaded, close the data packet marking of the relevant application).

2. The PCRF triggers according to the detected starting or stopping of the service type reported by the TDF entity, when the TDF entity reports the starting of a QQ application, the PCRF generates a data packet marking rule to trigger the PCEF or the BBERF to mark the GTP-U header for the data packet of the QQ application; when the TDF entity reports the stopping of the QQ application, the PCRF correspondingly generates a data packet marking rule, and then notifies the PCEF or the BBERF to relieve or close the marking function for the data flow of the QQ application, and such can prevent the PCEF or the BBERF from performing additional processing.

3. The PCRF triggers the opening or closing of GTP-U marking functions of the relevant application on the PCEF or BBERF, due to user subscription change. For example, a certain user changes from a subscriber of Skype to an unsubscribed user, then the PCRF needs to trigger update of a marking policy of a policy on a Gx/Gxx interface, and such update includes starting, stopping, change of marking class, and etc.

4. The PCRF starts or stops GTP-U marking functions of the relevant application on the PCEF or BBERF, according to the change of an operator policy on itself.

5. The PCRF triggers update of a marking policy of a policy on a Gx/Gxx interface, according to user account information (for example, via interaction between the PCRF and an online charging system OCS), and such update includes starting, stopping, change of marking class, and etc.

S606, The PCRF transmits a session modification message carrying the data packet marking rule to the bearer binding function entity.

Further, in a case of a GTP protocol, the PCRF transmits an IP connectivity access network session modification request message carrying an enhanced PCC rule to the PCEF entity via the interface Gx between the PCRF and the PCEF entity.

Moreover, in a case of a PMIP protocol, the PCRF transmits a gateway control session modification message carrying an enhanced QoS rule to the BBERF via the interface Gxx between the PCRF and the BBERF.

S607, The bearer binding function entity maps the data flow identified by the session modification message to an appropriate bearer according to the session modification message, and converts the differentiated services code point marking of the data flow identified by the data packet marking rule to the GTP-U header marking.

The data packet marking rule is the enhanced PCC rule or enhanced QoS rule.

Further, in the case of the GTP protocol, the policy and charging enforcement function entity maps the data flow identified by the enhanced PCC rule to an appropriate bearer according to the enhanced PCC rule, and converts the differentiated services code point marking of the data flow identified by the enhanced PCC rule to the GTP-U header marking.

Moreover, in the case of the PMIP protocol, the bearer binding and event reporting function entity maps the data flow identified by the enhanced QoS rule to an appropriate bearer according to the enhanced QoS rule, and converts the differentiated services code point marking of the data flow identified by the enhanced QoS rule to the GTP-U header marking.

Embodiments of the present invention provide a method for marking a service data packet, the session establishment request message carrying the data packet marking rule is transmitted to the bearer binding function entity, so that the bearer binding function entity can map the data flow identified by the data packet marking rule to the appropriate bearer according to the data packet marking rule, and mark the GTP-U header with the data flow description; in view of a case that the base station needs to add a data packet detection function on the PCEF for identifying target service data in the prior art, technical solutions of the present invention allow the base station to identify target service data and achieve a differentiated scheduling when the data packet arrives at the base station in a case that the PCEF does not possess the data packet detection function, so that the user experience can be improved.

Figure 7:
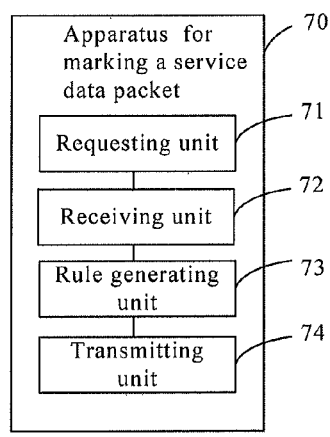
FIG. 7 is a structural schematic diagram of an apparatus for marking a service data packet according to an embodiment of the present invention.

An embodiment of the present invention provides an apparatus 70 for marking a service data packet, corresponding to the above method embodiment, all functional units of the apparatus 70 for marking a service data packet can be applied to steps of the above methods. As shown in FIG. 7, the apparatus includes:

a requesting unit 71, configured to request a traffic detection function entity TDF to detect a data flow description corresponding to a service application type or data flow starting or ending information corresponding to the service application type.

a receiving unit 72, configured to receive the data flow description corresponding to the service application type or a data flow starting or ending information report corresponding to the service application type, requested by the requesting unit and detected by the TDF.

a rule generating unit 73, configured to generate a data packet marking rule according to the data flow description corresponding to the service application type or the data flow starting or ending information report corresponding to the service application type, received by the receiving unit.

a transmitting unit 74, configured to transmit, to a bearer binding function entity BBF, a session modification message carrying the data packet marking rule generated by the generating unit, so that the BBF can map a data flow identified by the session modification message to a bearer according to the session modification message, and mark a GPRS tunneling protocol-user plane GTP-U header according to the data packet marking rule.

Further, the transmitting unit 74 is further configured to transmit a session establishment request message to the traffic detection function entity TDF, so that the TDF can detect the data flow description corresponding to the service application type or the data flow starting or ending information corresponding to the service application type.

The receiving unit 72 is specifically configured to receive a session establishment reply message returned by the TDF, where the session establishment reply message carries the detected data flow description corresponding to the service application type; or receive a session establishment reply message returned by the TDF, where the session establishment reply message carries the starting or ending report of the detected data flow corresponding to the service application type.

Further, the transmitting unit 74 is further configured to transmit differentiated services code point DSCP class information of the detected data packet corresponding to the service application type to the TDF.

Further, the transmitting unit 74 is specially configured to:

in a case of a GTP protocol, the BBF being a PCEF, transmit, to the PCEF, an IP connectivity access network IP-CAN session modification message carrying an enhanced PCC rule; or in a case of a PMIP protocol, the BBF being a bearer binding and event reporting function BBERF, transmit, to the BBERF, a gateway control session modification message carrying an enhanced QoS rule; or in a case of a GTP protocol, the BBF being a PCEF, transmit, to the PCEF, an IP-CAN session modification message carrying a perfecting and repairing rule and a PCC rule; or in a case of a PMIP protocol, the BBF being a BBERF, transmit, to the BBERF, a gateway control session modification message carrying the perfecting and repairing rule and a QoS rule.

Further, the receiving unit 72 is further configured to receive the detected data flow description corresponding to the service application type transmitted by the TDF; or receive the detected data flow starting or ending report corresponding to the service application type transmitted by the TDF; or receive, by the PCRF, the change information of network congestion status; or receive, by the PCRF, the change information of user subscription data; or the change information of an operator policy on PCRF; or receive, by the PCRF, the change information of user account information.

Further, the enhanced PCC rule, transmitted by the transmission unit 74, is a PCC rule added with a new element, and the enhanced PCC rule is for prompting the BBF to mark the GTP-U header for the data flow identified by the enhanced PCC rule; or the enhanced QoS rule is a QoS rule added with a new element, and the enhanced QoS rule is for prompting the bearer binding and event reporting function entity to mark the GTP-U header for the data flow identified by the enhanced QoS rule.

Further, in the case of the GTP protocol, the perfecting and repairing rule, transmitted by the transmission unit 74, includes at least one of the following:

data flow description information, for prompting the PCEF to perform the processing of the GTP-U header marking for the data flow corresponding to the data flow description in the perfecting and repairing rule;

an application type or application class value marking, for prompting the PCEF to mark the GTP-U header with an application type or an application class value for the data flow identified by the perfecting and repairing rule;

a data marking indicator, for prompting the PCEF to mark the GTP-U header with the application type or the application class value of the data flow identified by the perfecting and repairing rule;

a state marking, for prompting the PCEF to start to mark the GTP-U header of the data or stop marking the GTP-U header of the data.

In the case of the PMIP protocol, the perfecting and repairing rule includes at least one of the following:

data flow description information, for prompting the BBERF to perform the processing of the GTP-U header marking for the data flow corresponding to data flow description in the perfecting and repairing rule;

a service type or application class value marking, for prompting the BBERF to mark the GTP-U header with a service type or an application class value for the data flow identified by the perfecting and repairing rule;

a data marking indicator, for prompting the BBERF to mark the GTP-U header with the service type or the application class value for the data flow identified by the perfecting and repairing rule;

a state marking, for prompting the BBERF to start to mark the GTP-U header of the data or stop marking the GTP-U header of the data.

Figure 8:
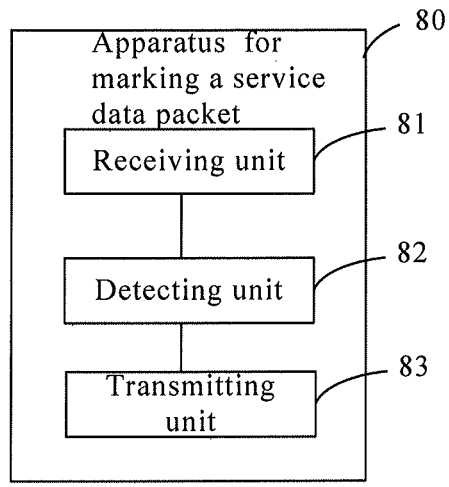
FIG. 8 is a structural schematic diagram of an apparatus for marking a service data packet according to another embodiment of the present invention.

An embodiment of the present invention provides an apparatus 80 for marking a service data packet, corresponding to the above method embodiment, all functional units of the apparatus 80 for marking a service data packet can be applied to steps of the above methods, as shown in FIG. 8, including:

a receiving unit 81, configured to receive, transmitted by a policy and charging rule function PCRF, a request of detecting data flow description corresponding to a service application type or data flow starting or ending information corresponding to the service application type.

a detecting unit 82, configured to perform data packet detection to detect the data flow corresponding to the service application type or a data flow starting or ending report corresponding to the service application type, after the receiving unit receives the request.

a transmitting unit 83, configured to transmit the data flow description corresponding to the service application type or the data flow starting or ending report corresponding to the service application type to the PCRF, detected by the detecting unit, so that the PCRF can generate a data packet marking rule, and transmit a session modification message carrying the data packet marking rule to a bearer binding function entity BBF, and then the BBF can map the data flow identified by the session modification message to a bearer according to the session modification message, and mark a GPRS tunneling protocol-user plane GTP-U header according to the data packet marking rule.

Further, the transmitting unit 83 is specifically configured to transmit a session establishment reply message carrying the detected data flow description corresponding to the service application type to the PCRF; or transmit a session establishment reply message carrying the data flow starting or ending report corresponding to the service application type to the PCRF.

Figure 9:
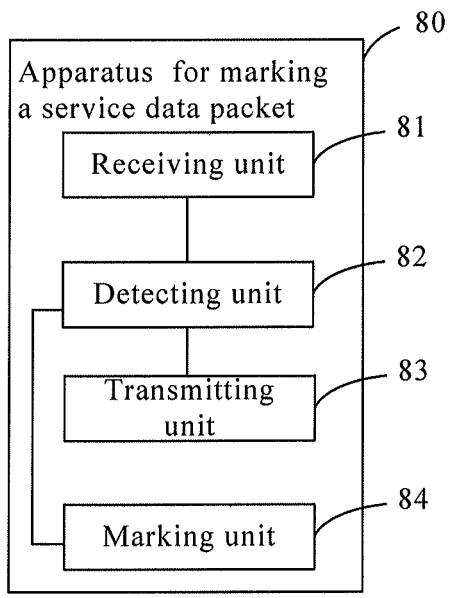
FIG. 9 is a structural schematic diagram of an apparatus for marking a service data packet according to another embodiment of the present invention.

Further, as shown in FIG. 9, the apparatus further includes:

a marking unit 84, configured to mark a differentiated services code point DSCP to an IP header of the detected data packet corresponding to the service application type.

Figure 10:
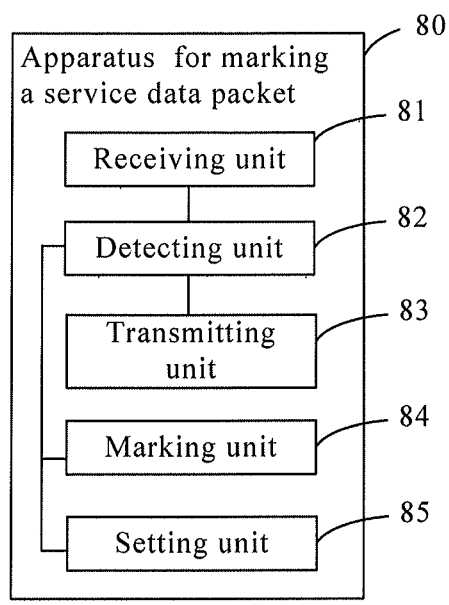
FIG. 10 is a structural schematic diagram of an apparatus for marking a service data packet according to another embodiment of the present invention.

Further, the receiving unit 81 is further configured to receive, transmitted by the PCRF, DSCP class information of the detected data packet corresponding to the service application type;

As shown in FIG. 10, the apparatus further includes:

a setting unit 85, configured to preset the DSCP class information of the data packet, detected by the detecting unit, corresponding to the service application type.

Further, the marking unit 84 is further configured to mark the differentiated services code point of the IP header of the detected data packet corresponding to the service application type as X; or mark the differentiated services code point of the IP header of the detected data packet corresponding to the service application type as X, and modify the differentiated services code point marking value of the IP header of the data packet with the differentiated services code point value of X corresponding to other application type to a non-X value.

Further, the transmitting unit 83 is further configured to transmit the starting or ending report of the detected data flow corresponding to the service application type to the PCRF; where the report carries the differentiated services code point marking value of the detected data flow corresponding to the service application type.

Figure 11:
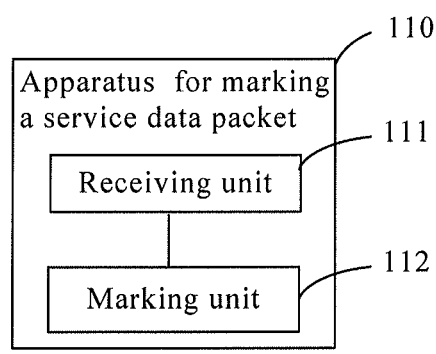
FIG. 11 is a structural schematic diagram of an apparatus for marking a service data packet according to another embodiment of the present invention.

An embodiment of the present invention provides an apparatus 110 for marking a service data packet, corresponding to the above method embodiment, all units of the apparatus 110 for marking a service data packet can be applied to steps of the above methods. As shown in FIG. 11, the apparatus includes:

a receiving unit 111, configured to receive, transmitted by a policy and charging rule function entity PCRF, a session modification message carrying a data packet marking rule, where the data packet marking rule is generated by the PCRF according to data flow description corresponding to a service application type or a data flow starting or ending report corresponding to the service application type, detected by a TDF.

a marking unit 112, configured to map a data flow identified by the session modification message to a bearer according to the session modification message received by the receiving unit, and mark a GTP-U header according to the data packet marking rule.

Further, the receiving unit 111 is further specifically configured to receive via a PCEF an IP connectivity access network IP-CAN session modification message carrying an enhanced PCC rule, transmitted by the PCRF, in a case of a GTP protocol.

The marking unit 112 is specifically configured to map the data flow identified by the session modification message, received by the receiving unit, to a bearer, and mark the GTP-U header according to the data packet marking rule. or the receiving unit 111 is specifically configured to receive via the BBERF a gateway control session modification message carrying an enhanced QoS rule, transmitted by the PCRF, in a case of a PMIP protocol.

The marking unit 112 is specifically configured to select a bearer according to the enhanced QoS rule, received by the receiving unit, map the data flow identified by the enhanced QoS rule to the selected bearer, and mark the GTP-U header. or the receiving unit 111 is further specifically configured to receive via the PCEF an IP-CAN session modification message carrying a perfecting and repairing rule and a PCC rule, transmitted by the PCRF, in a case of a GTP protocol.

The marking unit 112 is specifically configured to select a bearer according to the PCC rule, received by the receiving unit, map the data flow identified by the PCC rule to the selected bearer, and mark the GTP-U header for the data flow identified by the perfecting and repairing rule. or the receiving unit 111 is specifically configured to receive a gateway control session modification message carrying the perfecting and repairing rule and a QoS rule, transmitted by the PCRF, in a case of a PMIP protocol.

The marking unit 112 is specifically configured to select a bearer according to the QoS rule, received by the receiving unit, map the data flow identified by the QoS rule to the selected bearer, and mark the GTP-U header to the data flow identified by the perfecting and repairing rule.

Figure 12:
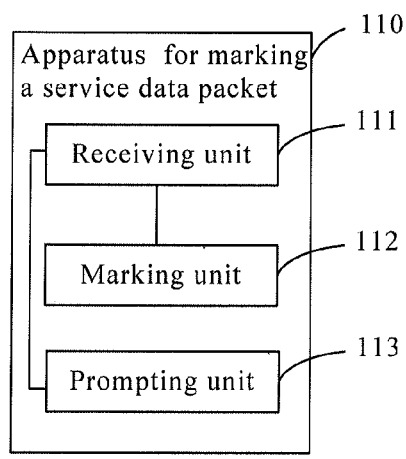
FIG. 12 is a structural schematic diagram of an apparatus for marking a service data packet according to another embodiment of the present invention.

Further, as shown in FIG. 12, the apparatus further includes:

a prompting unit 113, specifically configured to start to mark the GTP-U header with the data flow description according to prompt information or stop marking the GTP-U header with the data flow description according to prompt information; where the prompt information is a triggering condition for triggering the policy and charging enforcement function entity to start to mark the GTP-U header or stop marking the GTP-U header; or specifically configured to start to mark the GTP-U header with the data flow description according to prompt information or stop marking the GTP-U header with the data flow description according to prompt information; where the prompt information is a triggering condition for triggering the bearer binding and event reporting function entity to start to mark the GTP-U header or stop marking the GTP-U header.

Embodiments of the present invention provide an apparatus for marking a service data packet, a session establishment request message carrying the data packet marking rule is transmitted to the bearer binding function entity, so that the bearer binding function entity can map the data flow identified by the data packet marking rule to the appropriate bearer according to the data packet marking rule, and mark the GTP-U header with the data flow description; in view of a case that the base station needs to add a data packet detection function on the PCEF for identifying target service data in the prior art, technical solutions of the present invention allow the base station to identify target service data and achieve a differentiated scheduling when the data packet arrives at the base station in a case that the PCEF does not possess the data packet detection function, so that the user experience can be improved.

Figure 13:
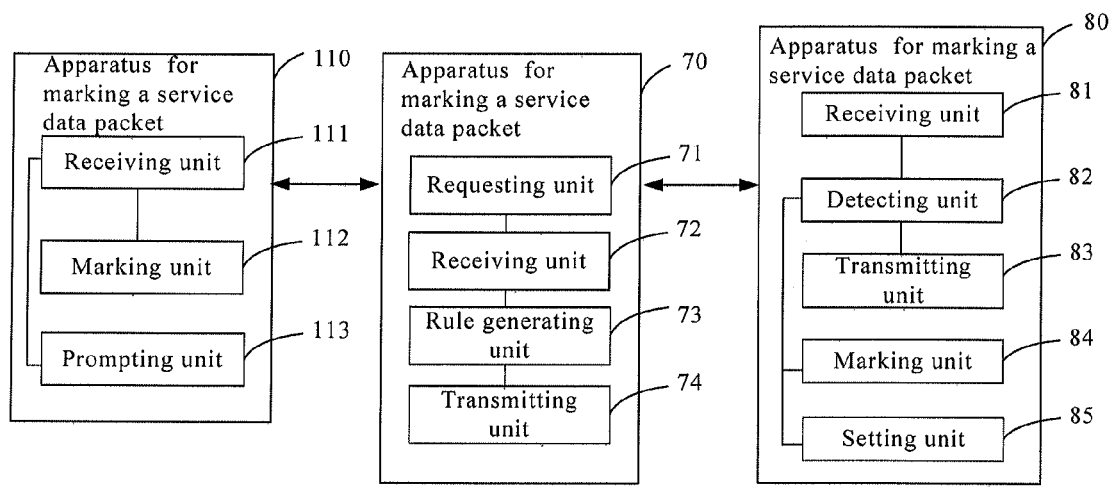
FIG. 13 is a schematic diagram of a system for marking a service data packet according to an embodiment of the present invention.

An embodiment of the present invention provides a communication system, corresponding to the above method embodiments and apparatus embodiments, all functional units of the system can be applied to steps of the above methods. As shown in FIG. 13:

The system includes the above three apparatuses for marking a service data packet, where, an apparatus for marking a service data packet can be a PCRF in practical applications, and the PCRF specifically includes: requesting a traffic detection function entity TDF to detect a data flow description corresponding to a service application type or data flow starting or ending information corresponding to the service application type; receiving the data flow description corresponding to the service application type or a data flow starting or ending information report corresponding to the service application type, detected and transmitted by the TDF, and generating a data packet marking rule according to the data flow description corresponding to the service application type or the data flow starting or ending information report corresponding to the service application type; and transmitting to a bearer binding function entity BBF a session modification message carrying the data packet marking rule, so that the BBF can map a data flow identified by the session modification message to a bearer according to the session modification message, and mark a GPRS tunneling protocol-user plane GTP-U header according to the data packet marking rule.

where, another apparatus for marking a service data packet can be the TDF in practical applications, and the TDF specifically includes: receiving, transmitted by the policy and charging rule function PCRF, a request of detecting the data flow description corresponding to the service application type or the data flow starting or ending information report corresponding to the service application type; performing data packet detection to detect the data flow description corresponding to the service application type or the data flow starting or ending report corresponding to the service application type; transmitting the detected data flow description corresponding to the service application type or the data flow starting or ending report corresponding to the service application type to the PCRF, so that the PCRF can generate the data packet marking rule, and transmit the session modification message carrying the data packet marking rule to the bearer binding function entity BBF, and then the BBF can map the data flow identified by the session modification message to a bearer according to the session modification message, and mark the GPRS tunneling protocol-user plane GTP-U header according to the data packet marking rule.

where, still another apparatus for marking a service data packet can be the BBF in practical applications, and the BBF specifically includes: receiving, transmitted by the policy and charging rule function entity PCRF, the session modification message carrying the data packet marking rule, where the data packet marking rule is generated by the PCRF according to the data flow description corresponding to the service application type or the data flow starting or ending report corresponding to the service application type, detected by the TDF; mapping the data flow identified by the session modification message to a bearer, and marking the GTP-U header according to the data packet marking rule.

Embodiments of the present invention provide a system for marking a service data packet, the session establishment request message carrying the data packet marking rule is transmitted to the bearer binding function entity, so that the bearer binding function entity can map the data flow identified by the data packet marking rule according to the data packet marking rule to the appropriate bearer, and mark the GTP-U header with the data flow description; in view of a case that the base station needs to add a data packet detection function on the PCEF for identifying target service data in the prior art, technical solutions of the present invention allow the base station to identify target service data and achieve a differentiated scheduling when the data packet arrives at the base station in a case that the PCEF does not possess the data packet detection function, so that the user experience can be improved.

A method for marking a service data packet according to still another embodiment of the present invention is applied in a case of providing data flow and application information by an external TDF or an application server, and is described by way of taking a RCRF as a policy and charging rule function entity, taking the TDF as a traffic detection function entity, and taking a PCEF or BBERF as a bearer binding function entity.

It should be noted that, the traffic detection function entity not only can be a TDF, but also can be an AF or P-CSCF application server or the other, as long as the data flow description can be provided, and the present invention is not limited thereto.

Figure 14:
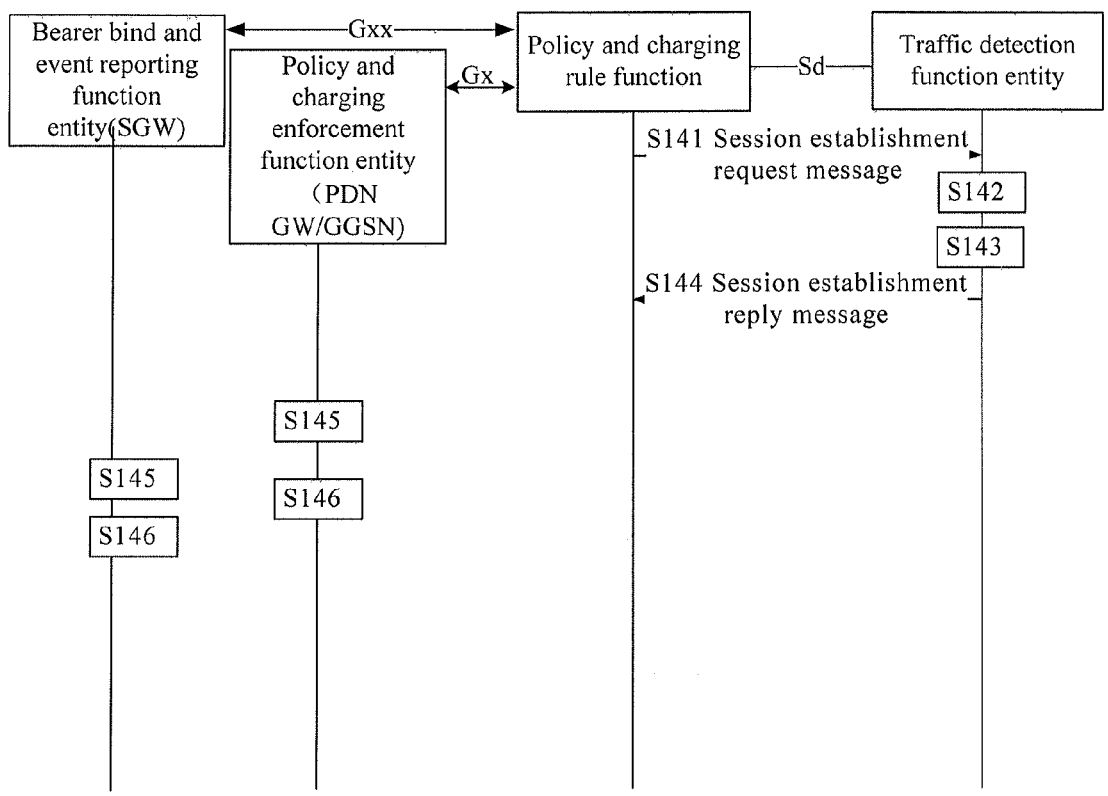
FIG. 14 is a flowchart of a method for marking a service data packet according to another embodiment of the present invention.

As shown in FIG. 14, the method includes steps as follows:

S141, The PCRF transmits a session establishment request message to the TDF.

S142, The TDF performs detection to the data packet.

For example, the TDF performs detection to all the data packets of IP-CAN bearer, to detect the data flow of the P2P service.

For example, the TDF performs detection to the P2P service data packet, to obtain a data flow description of the P2P service data packet, where the data flow description includes an application identifier, a description of the data flow associated with the application identifier, and so on.

S143, The TDF marks a differentiated services code point to an IP header of the detected data packet corresponding to the service application type.

It should be noted that, after the P2P service data packet is detected, the TDF cannot report the data flow description of the P2P application since the description information of the P2P service data packet changes very quickly, for example, the TDF is just ready for reporting the information of the P2P data flow description, but finds in two seconds that the description information of the P2P data flow changes again, and therefore, the TDF initiates to mark the DSCP to the IP header of the detected data packet corresponding to the service application type.

Further, the DSCP marking can be data flow class information of the detected data packet of the service application type, transmitted by the PCRF and received by the TDF.

For example, the PCRF issues an ADC rule, and meanwhile issues a class value corresponding to the Application ID, i.e., a DSCP value.

Or, the TDF presets the data flow class information of the detected data packet of the service application type.

Further, the TDF marks the DSCP to the IP header of the data of the detected data flow of the data packet corresponding to the service application type, which includes:

A: marking the DSCP of the IP header of the data of the data flow of the data packet corresponding to the P2P application type as X. or, B: marking the DSCP of the IP header of the data of the data flow of the data packet corresponding to the P2P application type as X, and converting the DSCP of the IP header of the data packet corresponding to other application type to a non-X value.

It should be noted that, the DSCP class value is one comprehensive class value which not only includes a class value of a certain application, but also includes subscription information of the user, etc.; for example, if the current user is a subscriber of Skype, a higher Skype service class can be provided for the user, and an ordinary priority and the type of a user terminal can be provided for a Skype-unsubscribed user; for example, a higher http browsing class can be provided for a user of a mobile handheld terminal, and for a terminal application of a data card type, an ordinary http browsing class and factors, such as a time period factor and a network condition factor, are provided. One or more of the above factors are a comprehensive factor which can be referenced by a network, such as a base station.

S144, The TDF returns a session establishment reply message to the PC RF.

S145, The bearer binding function entity receives the data flow description of the data packet corresponding to the service application type in a downlink data packet; the data flow description of the data packet includes: the differentiated services code point marking of the IP header of the data packet.

Further, in a case of a GTP protocol, the bearer binding function entity is a PCEF, and in a case of a PMIP protocol, the bearer binding function entity is a BBERF.

S146, The bearer binding function entity converts the differentiated services code point marking of the received data, of which the differentiated services code point marking of the IP header of the data packet is completed, to the GTP-U header marking.

Illustratively, in the case of the GTP protocol, the PCEF converts the DSCP marking of the received data, of which the DSCP marking of the IP header of the data packet is completed, to the GTP-U header marking.

Illustratively, in the case of the PMIP protocol, the BBERF converts the DSCP marking of the received data, of which the DSCP marking of the IP header of the data packet is completed, to the GTP-U header marking.

Embodiments of the present invention provide a method for marking a service data packet, the session establishment request message carrying the data packet marking rule is transmitted to the bearer binding function entity, so that the bearer binding function entity can map the data flow identified by the data packet marking rule according to the data packet marking rule to the appropriate bearer, and mark the GTP-U header with the data flow description; in view of a case that the base station needs to add a data packet detection function on the PCEF for identifying target service data in the prior art, technical solutions of the present invention allow the base station to identify target service data and achieve a differentiated scheduling when the data packet arrives at the base station in a case that the PCEF does not possess the data packet detection function, so that the user experience can be improved.

The above descriptions are merely specific implementations of the present invention, but not intended to limit the protection scope of the present invention. Any variations or replacements that can be easily derived by persons skilled in the art without departing from the present invention shall fall within the protection scope of the present invention. Therefore, the protection scope of the present invention is subject to the appended claims.

What is claimed is:

1. An apparatus for marking a service data packet, wherein the apparatus is a policy and charging rule function (PCRF), and the apparatus comprises:
    a requesting unit, configured to request a traffic detection function entity (TDF) to detect a data flow description corresponding to a service application type or detect data flow starting or ending information corresponding to the service application type;
    a receiving unit, configured to receive the data flow description corresponding to the service application type or a data flow starting or ending information report corresponding to the service application type, wherein the data flow description is requested by the requesting unit and detected by the TDF;
    a rule generating unit, configured to generate a data packet marking rule according to the data flow description received by the receiving unit; and
    a transmitting unit, configured to transmit, to a bearer binding function entity (BBF), a session modification message carrying the data packet marking rule generated by the generating unit, for the BBF to map a data flow identified by the session modification message to a bearer according to the session modification message, and mark a general packet radio service (GPRS) tunneling protocol-user plane (GTP-U) header according to the data packet marking rule.

2. The apparatus according to claim 1, wherein
    the transmitting unit is further configured to transmit a session establishment request message to the TDF, for the TDF to detect the data flow description;
    the receiving unit is configured to receive a session establishment reply message returned by the TDF, wherein the session establishment reply message carries the detected data flow description; or receive a session establishment reply message returned by the TDF, wherein the session establishment reply message carries the detected data flow starting or ending information report.

3. The apparatus according to claim 1, wherein
    the transmitting unit is further configured to transmit, to the TDF, differentiated services code point (DSCP) class information of data packet of the data flow corresponding to the service application type.

4. The apparatus according to claim 1, wherein
    the transmitting unit is configured to transmit, to the BBF, the session modification message as follows:
    in a case of a GTP protocol and the BBF being a policy and charging enforcement function entity (PCEF), transmit, to the PCEF, an IP connectivity access network (IP-CAN) session modification message carrying an enhanced policy and charging control (PCC) rule; or
    in a case of a proxy mobile IP (PMIP) protocol and the BBF being a bearer binding and event reporting function (BBERF), transmit, to the BBERF, a gateway control session modification message carrying an enhanced quality of service (QoS) rule; or
    in a case of a GTP protocol and the BBF being a PCEF, transmit, to the PCEF, an IP-CAN session modification message carrying a perfecting and repairing rule and a PCC rule; or
    in a case of a PMIP protocol and the BBF being a BBERF, transmit, to the BBERF, a gateway control session modification message carrying a perfecting and repairing rule and a QoS rule.

5. The apparatus according to claim 1, wherein
    the receiving unit is further configured to receive the detected data flow description corresponding to the service application type transmitted by the TDF; or receive the detected data flow starting or ending information report corresponding to the service application type transmitted by the TDF; or receive, by the PCRF, change information of a network congestion status; or receive, by the PCRF, change information of user subscription data; or obtaining change information of an operator policy on PCRF; or receive, by the PCRF, change information of user account information.

6. The apparatus according to claim 4, wherein
    the enhanced PCC rule, transmitted by the transmission unit, is a PCC rule added with a new element, and the enhanced PCC rule is for prompting the BBF to mark the GTP-U header for the data flow identified by the enhanced PCC rule; or
    the enhanced QoS rule is a QoS rule added with a new element, and the enhanced QoS rule is for prompting the BBERF to mark the GTP-U header for the data flow identified by the enhanced QoS rule.

7. The apparatus according to claim 6, wherein
    the enhanced PCC rule is formed by adding a data marking indicator in the PCC rule, to prompt the PCEF to mark the GTP-U header with an application type or an application class value of the data flow for the data flow identified by the enhanced PCC rule; or
    the enhanced PCC rule is formed by adding an application type or application class value marking in the PCC rule, to prompt the PCEF to mark the GTP-U header with an application type or an application class value of the data flow for the data flow identified by the enhanced PCC rule; or
    the enhanced PCC rule is formed by adding a state marking in the PCC rule, to prompt the PCEF to start to mark the GTP-U header of the data flow or stop marking the GTP-U header of the data flow; or
    the enhanced QoS rule is formed by adding a data marking in the QoS rule, to prompt the BBERF to mark the GTP-U header with a service type or an application class value of the data flow for the data flow identified by the enhanced QoS rule; or
    the enhanced QoS rule is formed by adding a service type or application class value marking in the QoS rule, to prompt the BBERF to mark the GTP-U header with a service type or an application class value of the data flow for the data flow identified by the enhanced QoS rule; or
    the enhanced QoS rule is formed by adding a state marking in the QoS rule, to prompt the BBERF to start to mark the GTP-U header of the data flow or stop marking the GTP-U header of the data flow.

8. The apparatus according to claim 4, wherein in the case of the GTP protocol, the perfecting and repairing rule, transmitted by the transmission unit, comprises at least one of the following:

data flow description information, for prompting the PCEF to mark the GTP-U header for the data flow corresponding to the data flow description in the perfecting and repairing rule;

an application type or application class value marking, for prompting the PCEF to mark the GTP-U header with an application type or an application class value of the data flow for the data flow identified by the perfecting and repairing rule;

a data marking indicator, for prompting the PCEF to mark the GTP-U header with an application type or an application class value of the data flow for the data flow identified by the perfecting and repairing rule;

a state marking, for prompting the PCEF to start to mark the GTP-U header of the data flow or stop marking the GTP-U header of the data flow;

in the case of the PMIP protocol, the perfecting and repairing rule comprises at least one of the following:

data flow description information, for prompting the BBERF to mark the GTP-U header for the data flow corresponding to the data flow description in the perfecting and repairing rule;

a service type or application class value marking, for prompting the BBERF to mark the GTP-U header with a service type or an application class value of the data flow for the data flow identified by the perfecting and repairing rule;

a data marking indicator, for prompting the BBERF to mark the GTP-U header with a service type or an application class value of the data flow for the data flow identified by the perfecting and repairing rule;

a state marking, for prompting the BBERF to start to mark the GTP-U header of the data flow or stop marking the GTP-U header of the data flow.

9. The apparatus according to claim 4, wherein
the enhanced PCC rule is formed by describing a service data flow template in the PCC rule with a DSCP value;
the enhanced QoS rule is formed by describing a service data flow template in the QoS rule with a DSCP value.

10. The apparatus according to claim 9, wherein
the enhanced PCC rule is formed by setting a value of a class field Precedence corresponding to the service data flow template in the enhanced PCC rule to be lowest or secondary lowest; or
the enhanced QoS rule is formed by setting a value of a class field Precedence corresponding to the service data flow template in the enhanced QoS rule to be lowest or secondary lowest.

11. An apparatus for marking a service data packet, wherein the apparatus is a traffic detection function entity (TDF), and the apparatus comprises:
a receiving unit, configured to receive, transmitted by a policy and charging rule function entity (PCRF), a request of detecting a data flow description corresponding to a service application type or detecting data flow starting or ending information corresponding to the service application type;
a detecting unit, configured to perform data packet detection to detect the data flow description or a data flow starting or ending information report corresponding to the service application type in response to the request received by the receiving unit;
a transmitting unit, configured to transmit the data flow description or the data flow starting or ending information report, detected by the detecting unit, to the PCRF, wherein the data flow description or the data flow starting or ending information report is used for the PCRF to generate a data packet marking rule, and the data packet marking rule is used for the BBF to mark a general packet radio service (GPRS) tunneling protocol-user plane (GTP-U) header according to the data packet marking rule.

12. The apparatus according to claim 11, wherein
the transmitting unit is configured to transmit a session establishment reply message carrying the detected data flow description corresponding to the service application type to the PCRF; or transmit a session establishment reply message carrying the data flow starting or ending information report corresponding to the service application type to the PCRF.

13. The apparatus according to claim 11, further comprising:
a marking unit, configured to mark a differentiated services code point (DSCP) to an IP header of a detected data packet corresponding to the service application type.

14. The apparatus according to claim 11, wherein
the receiving unit is further configured to receive, transmitted by the PCRF, DSCP class information of the detected data packet corresponding to the service application type;
the apparatus further comprises:
a storing unit, configured to store preset DSCP class information of the data packet corresponding to the service application type detected by the detecting unit.

15. The apparatus according to claim 13, wherein
the marking unit is further configured to mark the differentiated services code point of the IP header of the detected data packet corresponding to the service application type as X; or mark the differentiated services code point of the IP header of the detected data packet corresponding to the service application type as X, and modify the differentiated services code point marking value of an IP header of the data packet with the differentiated services code point value of X corresponding to other application type to a non-X value.

16. The apparatus according to claim 11, wherein:
the transmitting unit is further configured to transmit the detected data flow starting or ending information report corresponding to the service application type to the PCRF, wherein the report carries a differentiated services code point marking value of the detected data flow corresponding to the service application type.

17. An apparatus for marking a service data packet, wherein the apparatus is a bearer binding function entity (BBF), and the apparatus comprises:
a receiving unit, configured to receive, transmitted by a policy and charging rule function entity (PCRF), a session modification message carrying a data packet marking rule, wherein the data packet marking rule is generated by the PCRF according to a data flow description corresponding to a service application type or a data flow starting or ending information report corresponding to the service application type, detected by a traffic detection function entity (TDF);
a marking unit, configured to map a data flow identified by the session modification message to a bearer according to the session modification message received by the receiving unit, and mark a general packet radio service (GPRS) tunneling protocol-user plane (GTP-U) header according to the data packet marking rule.

18. The apparatus according to claim 17, wherein
the receiving unit is further configured to receive via a policy and charging enforcement function entity (PCEF) an IP connectivity access network (IP-CAN) session modification message carrying an enhanced policy and charging control (PCC) rule, transmitted by the PCRF, in a case of a GTP protocol; and the marking unit is configured to map the data flow identified by the session modification message, received by the receiving unit, to a bearer, and mark the GTP-U header according to the data packet marking rule;

or the receiving unit is configured to receive via a bearer binding and event reporting function (BBERF) a gateway control session modification message carrying an enhanced quality of service (QoS) rule, transmitted by the PCRF, in a case of a proxy mobile IP (PMIP) protocol; and the marking unit is configured to select a bearer according to the enhanced QoS rule, received by the receiving unit, map the data flow identified by the enhanced QoS rule to the selected bearer, and mark the GTP-U header;

or the receiving unit is further configured to receive via the PCEF an IP-CAN session modification message carrying a perfecting and repairing rule and a PCC rule, transmitted by the PCRF, in a case of a GTP protocol; and the marking unit is configured to select a bearer according to the PCC rule, received by the receiving unit, map the data flow identified by the PCC rule to the selected bearer, and mark the GTP-U header to the data flow identified by the perfecting and repairing rule;

or the receiving unit is configured to receive a gateway control session modification message carrying a perfecting and repairing rule and a QoS rule, transmitted by the PCRF, in a case of a PMIP protocol; and the marking unit is configured to select a bearer according to the QoS rule, received by the receiving unit, map the data flow identified by the QoS rule to the selected bearer, and mark the GTP-U header to the data flow identified by the perfecting and repairing rule.

19. The apparatus according to claim 18, wherein the enhanced PCC rule, transmitted by the transmission unit, is a PCC rule added with a new element, and the enhanced PCC rule is for prompting the BBF to mark the GTP-U header for the data flow identified by the enhanced PCC rule; or the enhanced QoS rule is a QoS rule added with a new element, and the enhanced QoS rule is for prompting the BBERF to mark the GTP-U header for the data flow identified by the enhanced QoS rule;

the enhanced PCC rule is formed by describing a service data flow template in the PCC rule with a DSCP value;

the enhanced QoS rule is formed by describing a service data flow template in the QoS rule with a DSCP value.

20. The apparatus according to claim 18, further comprising:

a prompting unit, configured to start to mark the GTP-U header with the data flow description according to prompt information or stop marking the GTP-U header with the data flow description according to prompt information; wherein the prompt information is a triggering condition for triggering the PCEF to start to mark the GTP-U header or stop marking the GTP-U header; or specifically configured to start to mark the GTP-U header with the data flow description according to prompt information or stop marking the GTP-U header with the data flow description according to prompt information; wherein the prompt information is a triggering condition for triggering the BBERF to start to mark the GTP-U header or stop marking the GTP-U header.

* * * * *